US006662090B2

(12) United States Patent
Toyama et al.

(10) Patent No.: US 6,662,090 B2
(45) Date of Patent: Dec. 9, 2003

(54) PROTECTIVE MAINTENANCE SERVICE SYSTEM FOR VEHICLES

(75) Inventors: Atsuya Toyama, Tokyo (JP); Tatsuo Yoshioka, Ichikawa (JP); Akio Ito, Tokyo (JP); Toshio Manaka, Hitachinaka (JP); Takashi Nakahara, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/099,908

(22) Filed: Mar. 13, 2002

(65) Prior Publication Data

US 2002/0193923 A1 Dec. 19, 2002

(30) Foreign Application Priority Data

Jun. 15, 2001 (JP) ........................................ 2001-182311

(51) Int. Cl.[7] ............................. G06F 7/00; G06F 19/00
(52) U.S. Cl. ..................... 701/30; 340/933; 340/938; 340/457; 342/357.13; 342/457
(58) Field of Search ............................. 701/30, 29, 35, 701/31, 32, 33, 200–215; 340/933, 938, 943, 438, 457, 940, 992, 995, 993; 707/104.1, 102; 700/99, 106; 342/357.13, 457

(56) References Cited

U.S. PATENT DOCUMENTS

| | | | |
|---|---|---|---|
| 5,557,268 A | * | 9/1996 | Hughes et al. ............... 340/933 |
| 5,797,134 A | | 8/1998 | McMillan et al. ........... 705/400 |
| 5,864,305 A | | 1/1999 | Rosenquist .................. 340/405 |
| 5,873,066 A | | 2/1999 | Underwood et al. ........... 705/4 |
| 5,931,878 A | * | 8/1999 | Chapin, Jr. .................. 701/30 |
| 5,950,169 A | | 9/1999 | Borghesi et al. ............... 705/4 |
| 6,064,970 A | | 5/2000 | McMillan et al. ............... 705/4 |
| 6,125,312 A | * | 9/2000 | Nguyen et al. ................ 701/35 |
| 6,185,540 B1 | | 2/2001 | Schreitmueller et al. ........ 705/4 |
| 6,339,736 B1 | * | 1/2002 | Moskowitz et al. ........... 701/20 |
| 2001/0044733 A1 | | 11/2001 | Lee et al. ....................... 705/4 |
| 2002/0002475 A1 | | 1/2002 | Freedman et al. .............. 705/4 |
| 2002/0004730 A1 | | 1/2002 | Yoshioka et al. ............... 705/4 |
| 2002/0007225 A1 | * | 1/2002 | Costello et al. ............... 700/99 |
| 2002/0007289 A1 | | 1/2002 | Malin et al. .................... 705/4 |
| 2002/0087578 A1 | * | 7/2002 | Vroman .................... 707/104.1 |

FOREIGN PATENT DOCUMENTS

EP    1050853    11/2000

OTHER PUBLICATIONS

JP Pat. Appl. No. 2001–37858 filed Feb. 15, 2001 corresponding to U.S. Pat. Appl. No. 09/945,156.
JP Pat. Appl. No. 11–245203 filed Aug. 31, 1999 corresponding to U.S. Pat. Appl. No. 09/650,374.
JP Pat. Appl. No. 2000–205783 filed Jul. 6, 2000 corresponding to U.S. Pat. Appl. No. 09/725,242.

* cited by examiner

Primary Examiner—William A. Cuchlinski, Jr.
Assistant Examiner—Tuan C To
(74) Attorney, Agent, or Firm—Hogan & Hartson, LLP

(57) ABSTRACT

The present invention provides a protective maintenance service system capable of raising an alarm for the replacement of a part when the degradation of an inspection required part reaches the prescribed criteria of replacement. Of the respective inspection required parts stored in the vehicle inspection parts database for the respective vehicles stored in the vehicle database provided by a business unit in advance, the time of part replacement is determined on the basis of the data detected by a part condition sensor for a part having a part condition sensor, and on the basis of the time, which is obtained from the service life compensated with an actual service environment, for a part without a part condition sensor.

21 Claims, 21 Drawing Sheets

FIG.19

Please input the following items:

1. Business unit name
2. Address
3. Business type
4. Telephone No.
5. Capital
6. Number of vehicles
7. Others

NEXT

FIG.20

You have been registered as a member.
Your member No. and ID code are:

Member No.: XXXXX
ID code: YYYY

Please input the following items:

1. Vehicle control No.
2. Maker name
3. Vehicle kind
4. Vehicle grade
5. Vehicle type
6. Cubic capacity
7. First registration year and month
8. Registration No.
9. Total mileage
10. Others

NEXT

FIG.22

Please input the parts monitored by the part condition sensors.

1. AAA
2. BBBB
3. CCCC
4. DEDE
5. FGFG
6. HIHI

NEXT

FIG.23

Please input the list of inspection required parts.

1. ABAB
2. CDCD
3. EFEF
4. GHIH
5. JKLJ
6. MNOO
   ⋮
   ⋮

NEXT

FIG.24

List of parts needed to replace

1. AAB
2. CCD
3. EFFG
4. HIJJ
5. KLMK
6. NOPP
   ⋮
   ⋮

NEXT

FIG.25

List of replaced parts

1. ABAC
2. DDEE
3. FGHI
4. JKLM
5. NOPN
6. QRSS

NEXT

PROTECTIVE MAINTENANCE SERVICE SYSTEM FOR VEHICLES

FIELD OF THE INVENTION

The present invention relates to a preventive maintenance service system, in which an alarm is raised when the time of replacement of an inspection required part is approaching by determining the condition of degradation of the inspection required part used for a vehicle on the basis of the service life of a vehicle part, and the information on the vehicle part condition by a part condition sensor and the environment information of the vehicle in service, which are collected at a center.

BACKGROUND OF THE INVENTION

The development of automobile industry has brought a motorized society, in which the roads are full of vehicles. If they are not maintained well, these vehicles encounter abnormalities, causing a failure to end up with a serious accident in an extreme case. So the law requires the owner of a vehicle maintenance and inspection, and receiving the automobile inspection certificate issued by the land transportation bureau every two years, and the regular inspections such as 3 and 6-month inspections.

However, a vehicle once purchased will be in service for a long time period and the parts mounted on the vehicle are continuously in operation, while most of the parts are expendables and have the limits of service life. These vehicle parts are categorized as one group whose failures don't affect the vehicle operation and the other group whose failures affect it adversely. The latter group of parts needs to be replaced before a failure occurs.

The inspection of vehicle parts has been normally conducted hitherto when a regular inspection and the subsequent legal inspection are performed for receiving the automobile inspection certificate issued by the land transportation bureau. However, the parts have been actually replaced when a failure occurs, for the recent parts of vehicle are of excellent performance and rarely encounter failures. It is hard to find the degradation of vehicle parts by the appearance and the degradation sometimes develops faster depending on the frequency in use of a part. Once a failure occurs, it will result in a difficult situation to drive, since a repair such as replacement of parts is usually mandatory to put a vehicle into service again.

Vehicle parts will degrade by secular change even if a vehicle is kept unused and the speed of degradation of a part varies with the environment of a vehicle in service (heavy snowfall district, coastal district) for the vehicles of the same type. Therefore, there has been a problem that a vehicle cannot be driven in the constantly stable conditions, since the maintenance with sufficient care is not able to be performed by only having an inspection of vehicle parts at receiving an automobile inspection certificate or a legal inspection.

SUMMARY OF THE INVENTION

One of the objects of the present invention is to provide a protective maintenance service system capable of raising an alarm for the replacement of a part when the degradation of an inspection required part reaches the prescribed criteria of replacement. In the system, the condition of degradation of the inspection required part is determined by the service life of the inspection required part used for a vehicle and the information on the vehicle part condition obtained by a part condition sensor, or by the environment of a vehicle in service, the road environment and the mileage, considering the service life of vehicle part.

Another object of the present invention is to provide a protective maintenance service system capable of transmitting the expected time of part replacement regularly by predicting the time of part replacement when an inspection required part reaches the prescribed criteria. In the system, the condition of degradation of the inspection required part is determined by the service life of the inspection required part used for a vehicle and the information on the vehicle part condition obtained by the part condition sensor, or by the environment of a vehicle in service, the road environment and the mileage, considering the service life of vehicle part. In addition, the degradation development of the inspection required part is predicted with the mileage per time in the past and the conditions of the vehicle in service.

One feature of the present invention provides a protective maintenance service system for vehicles by a service provider, with which a business unit that controls a plurality of vehicles makes a contract of protective maintenance service for monitoring conditions of inspection required parts of the respective vehicles that are under the control of the business unit, wherein of the respective inspection required parts stored in a vehicle inspection parts database for the respective vehicles, which are provided by the business unit in advance and stored in a vehicle database, when a time of part replacement is approaching, an alarm is raised for a part having a part condition sensor according to the data detected by the part condition sensor, and for a part without a part condition sensor according to a service life compensated with an actual service environment.

Another feature of the present invention provides a protective maintenance service system for vehicles by a service provider, with which a business unit that controls a plurality of vehicles makes a contract of protective maintenance service for monitoring conditions of inspection required parts of the respective vehicles that are under the control of the business unit, wherein of the respective inspection required parts stored in a vehicle inspection parts database for the respective vehicles, which are provided by the business unit in advance and stored in a vehicle database, an expected time of part replacement is supplied for a part having a part condition sensor by computing the expected time of part replacement with the change of an inspection required part per time and the degree of degradation development of th e inspection required part, which is computed with the change of the inspection required part per time detected by the part condition sensor and a mileage per time in the past, and for a part without a part condition sensor by computing an expected time of part replacement with a service life compensated with an actual service environment.

BRIEF DESCRIPTION OF THE DRAWINGS

FIG. 19 is a figure illustrating the display page for inputting the information on a business unit at the application for the member of the protective maintenance service of vehicles.

FIG. 20 is a figure illustrating the display page for notification of the member registration of the protective maintenance service of vehicles.

FIG. 21 is a figure illustrating the display page for inputting the vehicle information, which is required for a member to have the service of the protective maintenance service of vehicles.

FIG. 22 is a figure illustrating the display page for inputting the parts monitored by the part condition sensors mounted on a vehicle, with which the protective maintenance service of vehicles is to be applied.

FIG. 23 is a figure illustrating the display page for inputting the list of the inspection required parts of the parts mounted on a vehicle, with which the protective maintenance service of vehicles is to be applied.

FIG. 24 is a figure illustrating the display page for inputting the list of the parts needed to replace, which is required to have the protective maintenance service of vehicles.

FIG. 25 is a figure illustrating the display page for inputting the list of the parts having been replaced under the protective maintenance service of vehicles.

DESCRIPTION OF THE PREFERRED EMBODIMENTS

Figure 1:
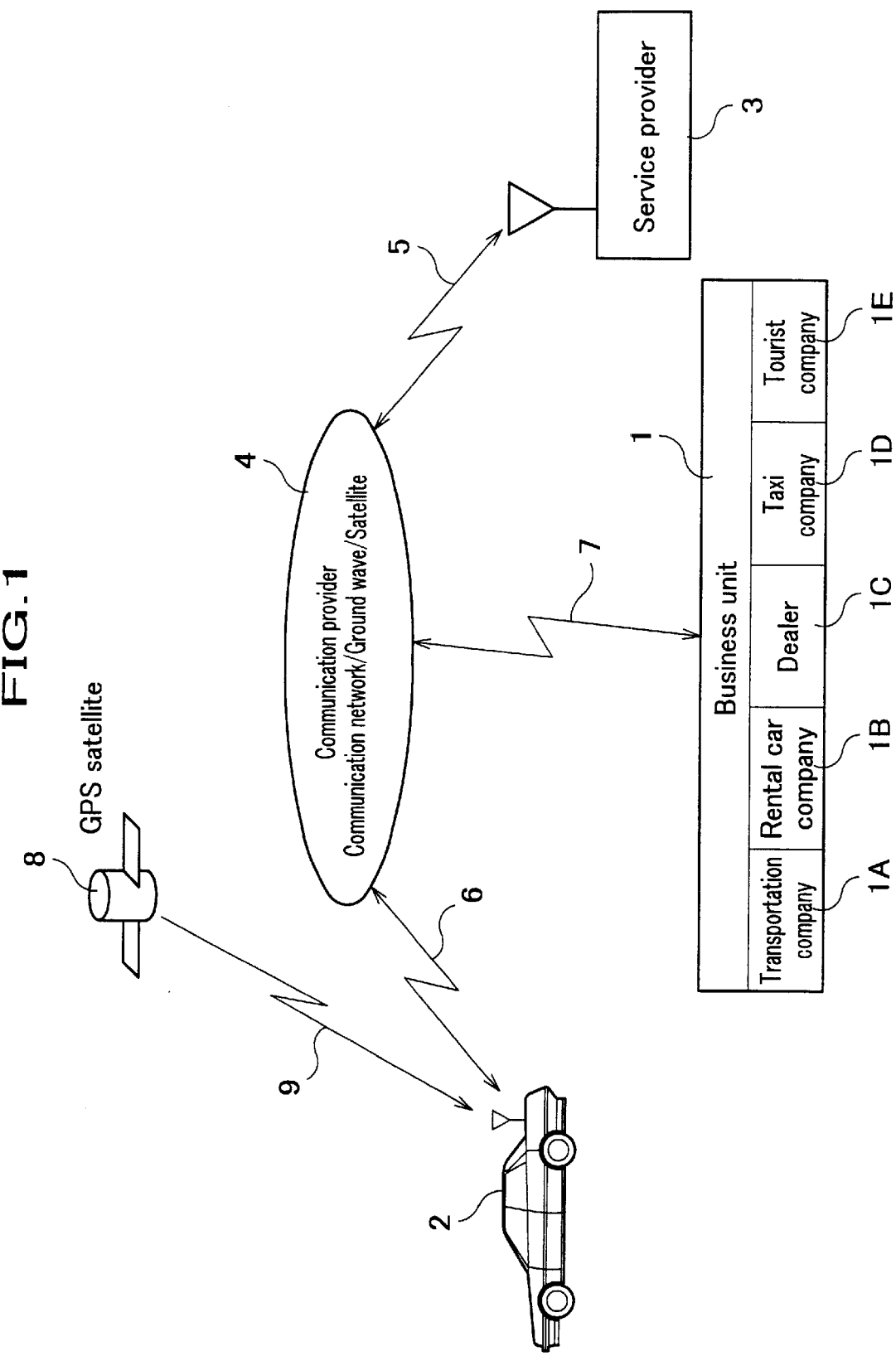
FIG. 1 is a figure showing an overall structure and relation of information transmittal/reception to implement the protective maintenance service system of vehicles.
Figure 2:
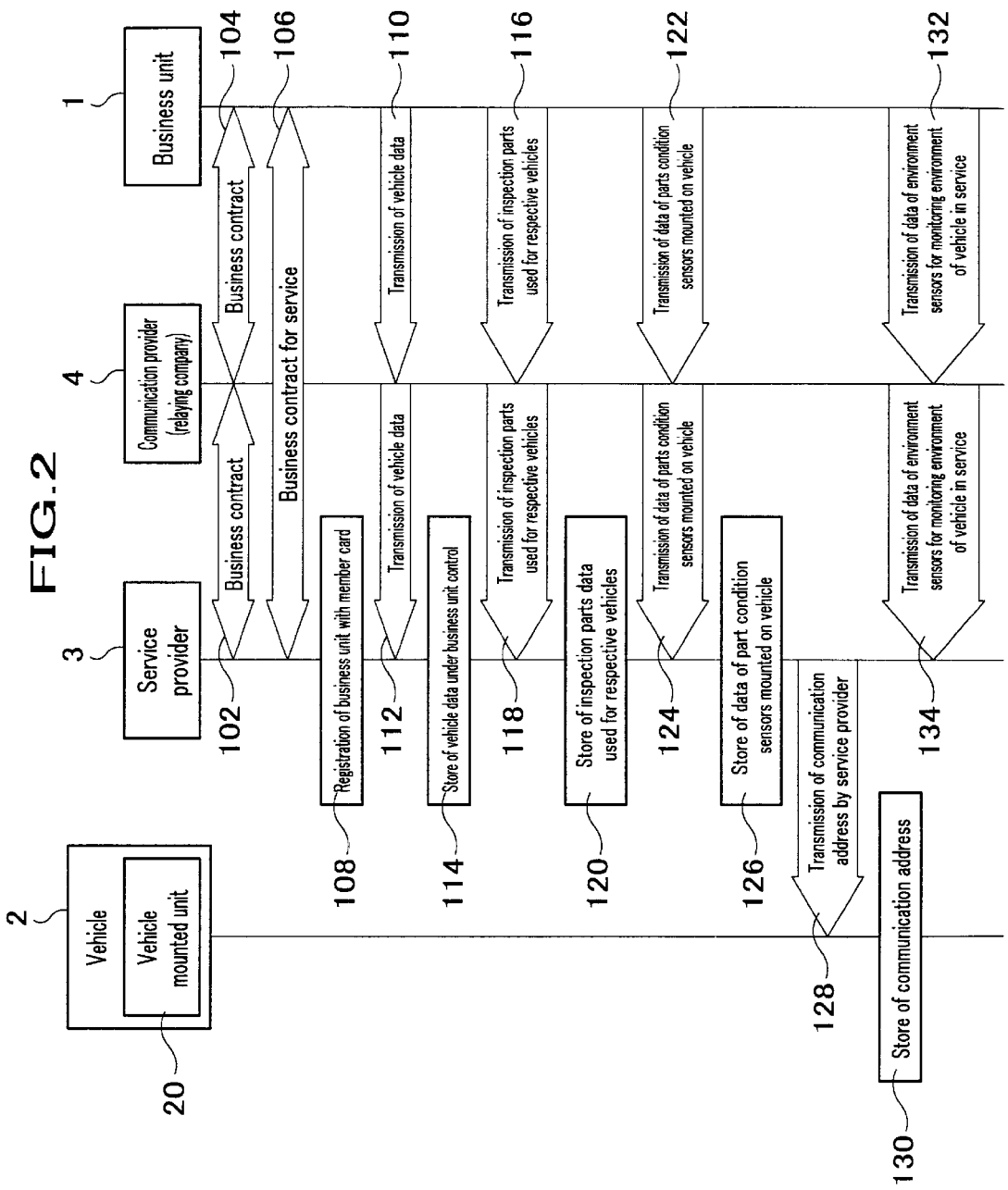
FIG. 2 is a figure showing the system structure of the protective maintenance service system of vehicles according to an embodiment of the present invention.
Figure 3:
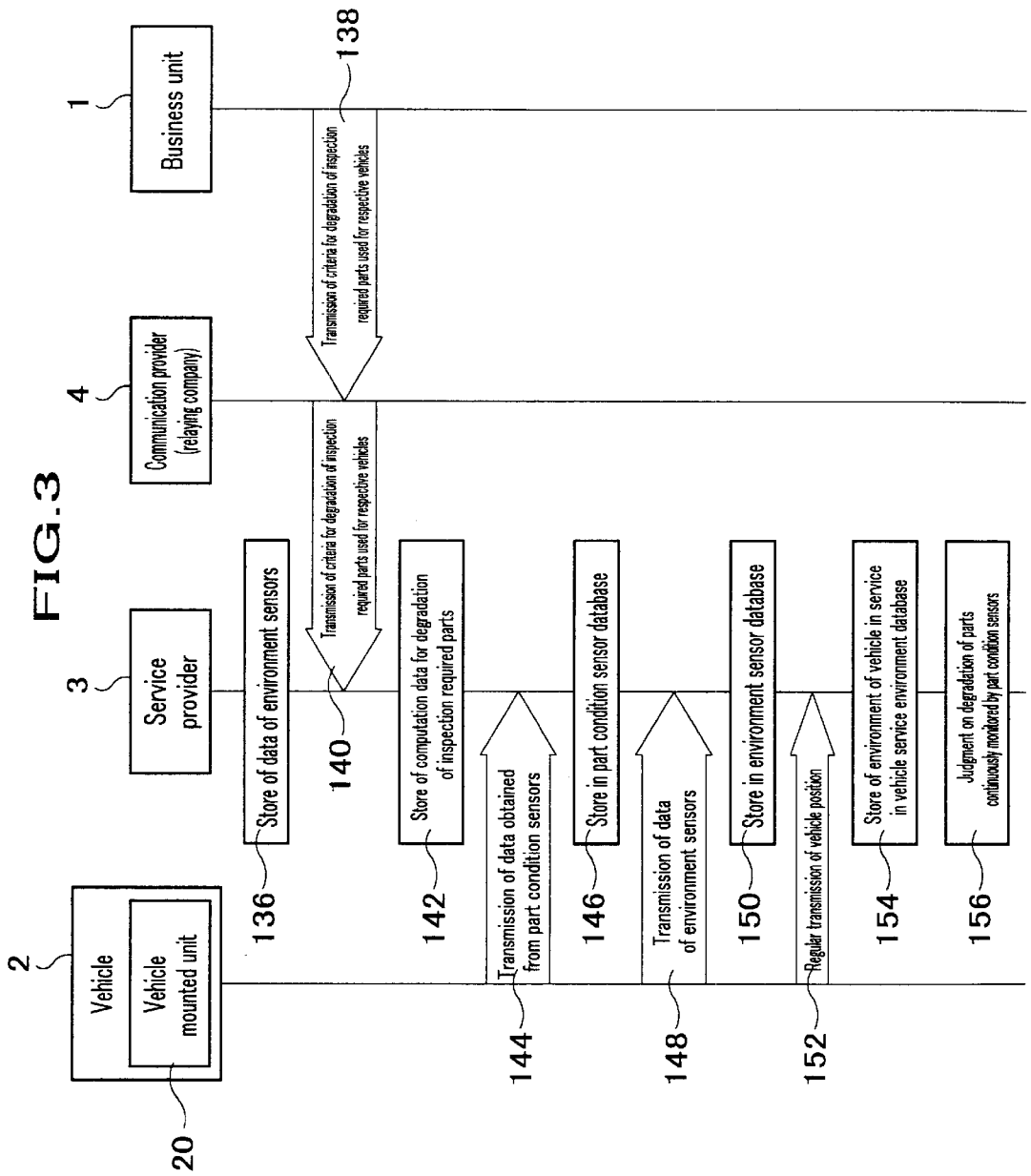
FIG. 3 is a figure showing the system structure of the protective maintenance service system of the vehicle according to an embodiment of the present invention.
Figure 4:
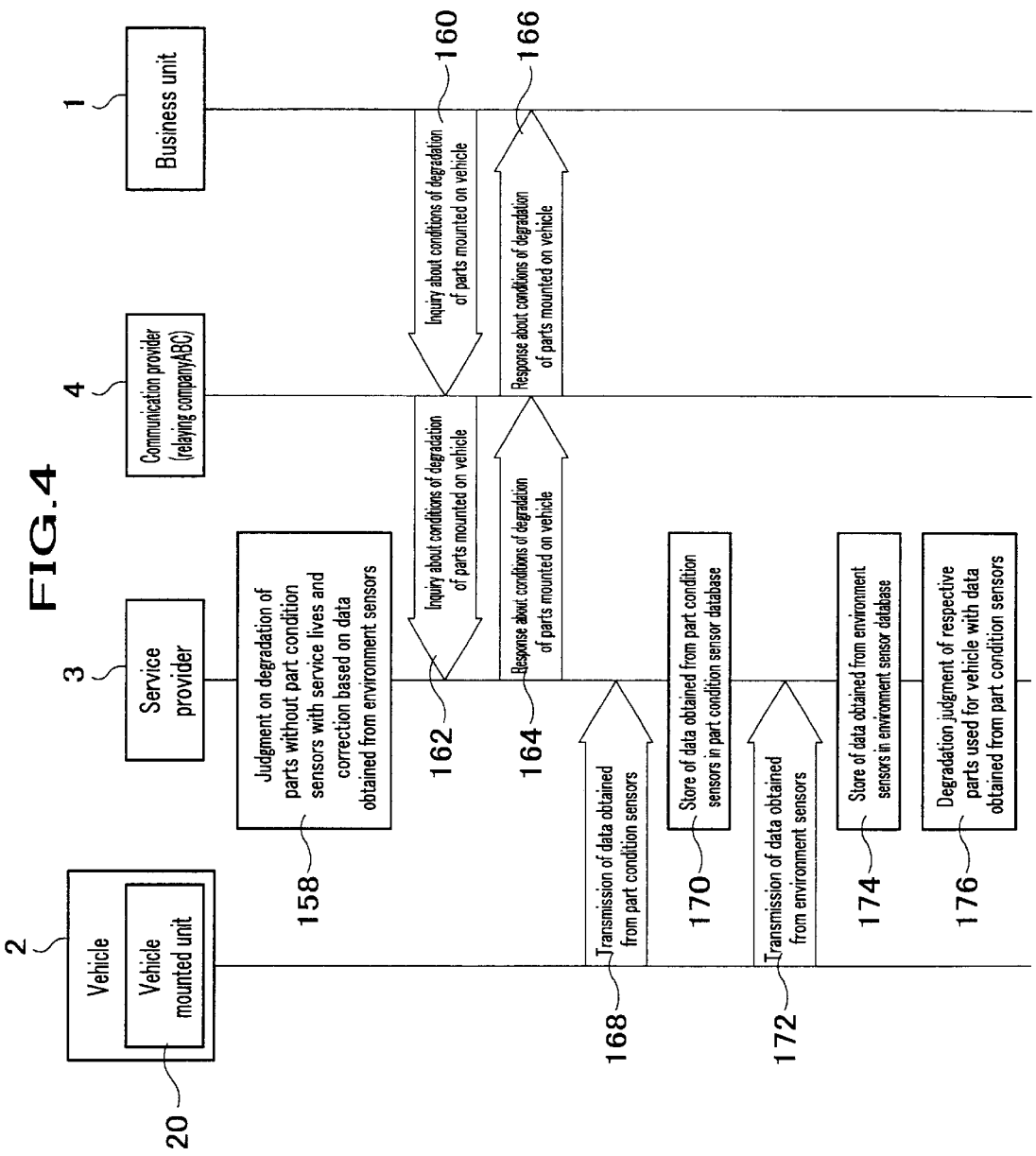
FIG. 4 is a figure showing the system structure of the protective maintenance service system of vehicles according to an embodiment of the present invention.
Figure 5:
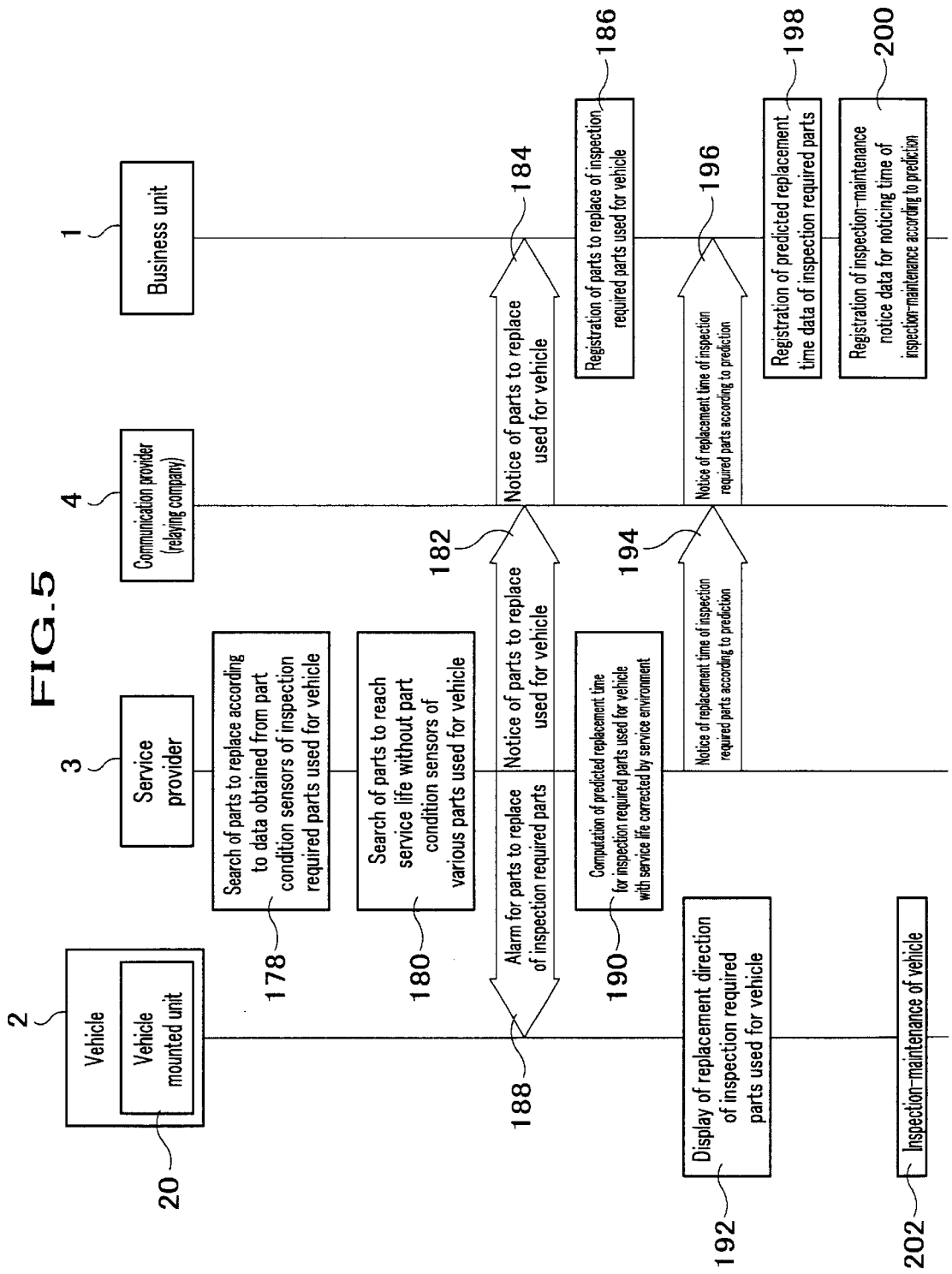
FIG. 5 is a figure showing the system structure of the protective maintenance service system of vehicles according to an embodiment of the present invention.
Figure 6:
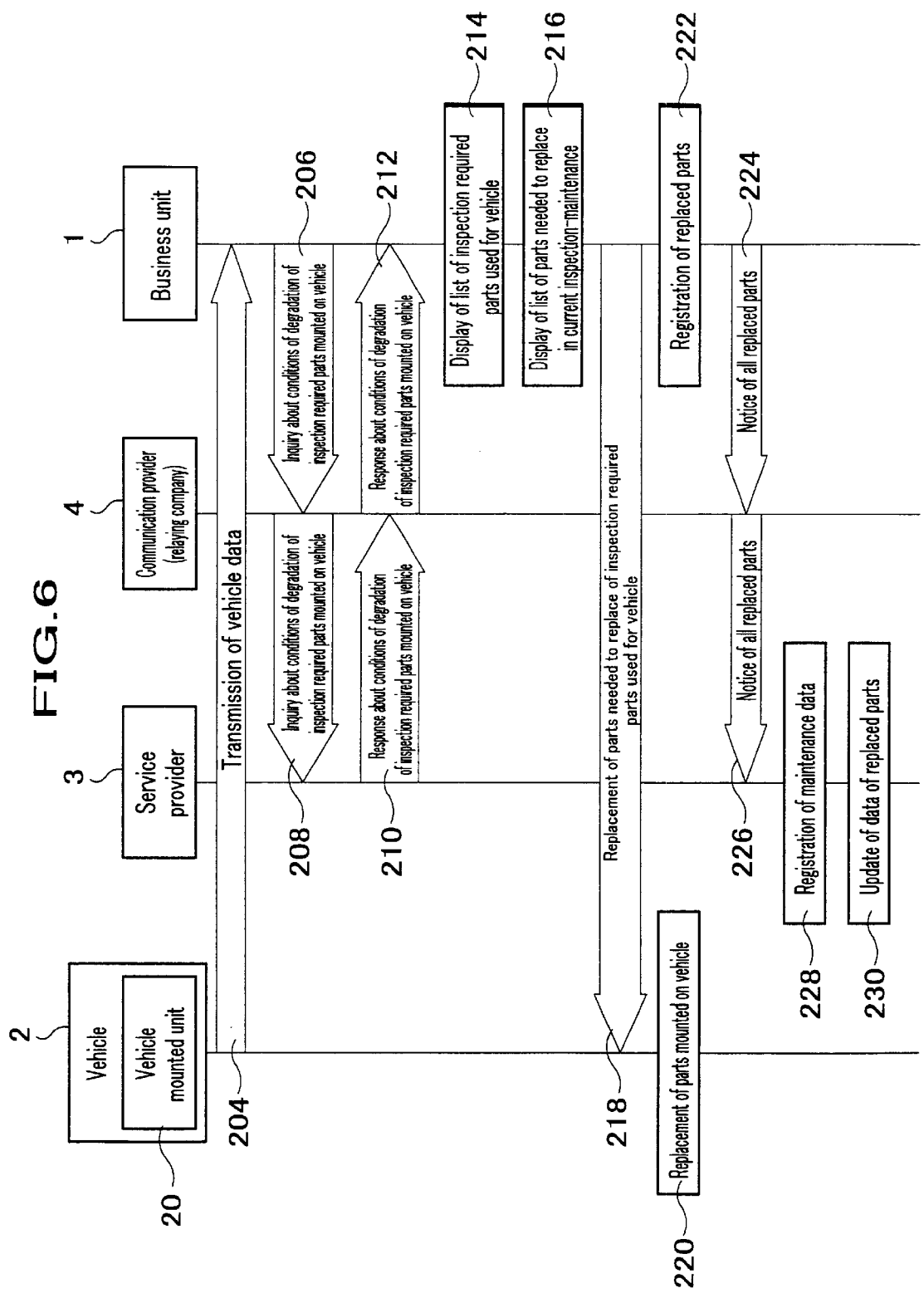
FIG. 6 is a figure showing the system structure of the protective maintenance service system of vehicles according to an embodiment of the present invention.

FIG. 1 shows the overall structure and relation of information transmission and reception, which is for performing the protective maintenance service system. FIGS. 2 through 6 show the protective service system according to an embodiment of the present invention.

A business unit 1 has a business contract with a service provider 3 for controlling the degradation of parts of a vehicle 2 under the control of the business unit 1 and supplying the service of the prediction and alarming for the time of part replacement.

The business unit 1 transmits the information on the vehicle 2 under its control and the information on the parts used for the vehicle 2 to the service provider 3. On the other hand, the service provider 3 controls the conditions of parts degradation of the vehicle 2 under the control of the business unit 1 and transmits the information on services such as the prediction and alarm for the time of part replacement. A public line or a satellite may be used for the transmission between the business unit 1 and the service provider 3. As an example of convenient transmitting of the information on the various kinds of services from the service provider 3 to the business unit 1, there is a method, in which the information on the services supplied by the service provider 3 is transmitted to a communication provider 4 serving as communication relay media, which utilizes a communication network/ground wave/satellite through a line 5, and then transmitted to the business unit 1 through a line 7 from the communication provider 4.

The service provider 3 is to supply the service of parts information under the contract with the business unit 1 as mentioned above. The business unit 1 includes a transportation company 1A possessing a large number of trucks, a rental car company 1B to rent cars, a car dealer 1C to sell automobiles and perform the procedure for the automobile inspection certificate and regular inspections, a taxi company 1D possessing a large number of passenger cars and a tourist company 1E possessing a large number of tourist busses.

The service provider 3 receives the vehicle information on the vehicle 2 and the information on parts used for the vehicle 2 under the control of the business unit 1, transmitted by the business unit 1. When the service provider 3 is requested the service of parts information by the business unit 1, it will send the service of parts information required by the business unit 1 to the communication provider 4 serving as communication relay media (communication network/ground wave/satellite) through the line 5. The communication provider 4 will send it to the business unit 1 through the line 7 when receiving the request for the service of parts information from the business unit 1. And the service provider 3 will send the alarm for the parts replacement to the communication provider 4 through the line 5, and then the alarm is sent to a vehicle mounted unit 20 of the vehicle 2 by the communication provider 4 through the line 6, when the parts information is of an alarm for the parts replacement.

Figure 7:
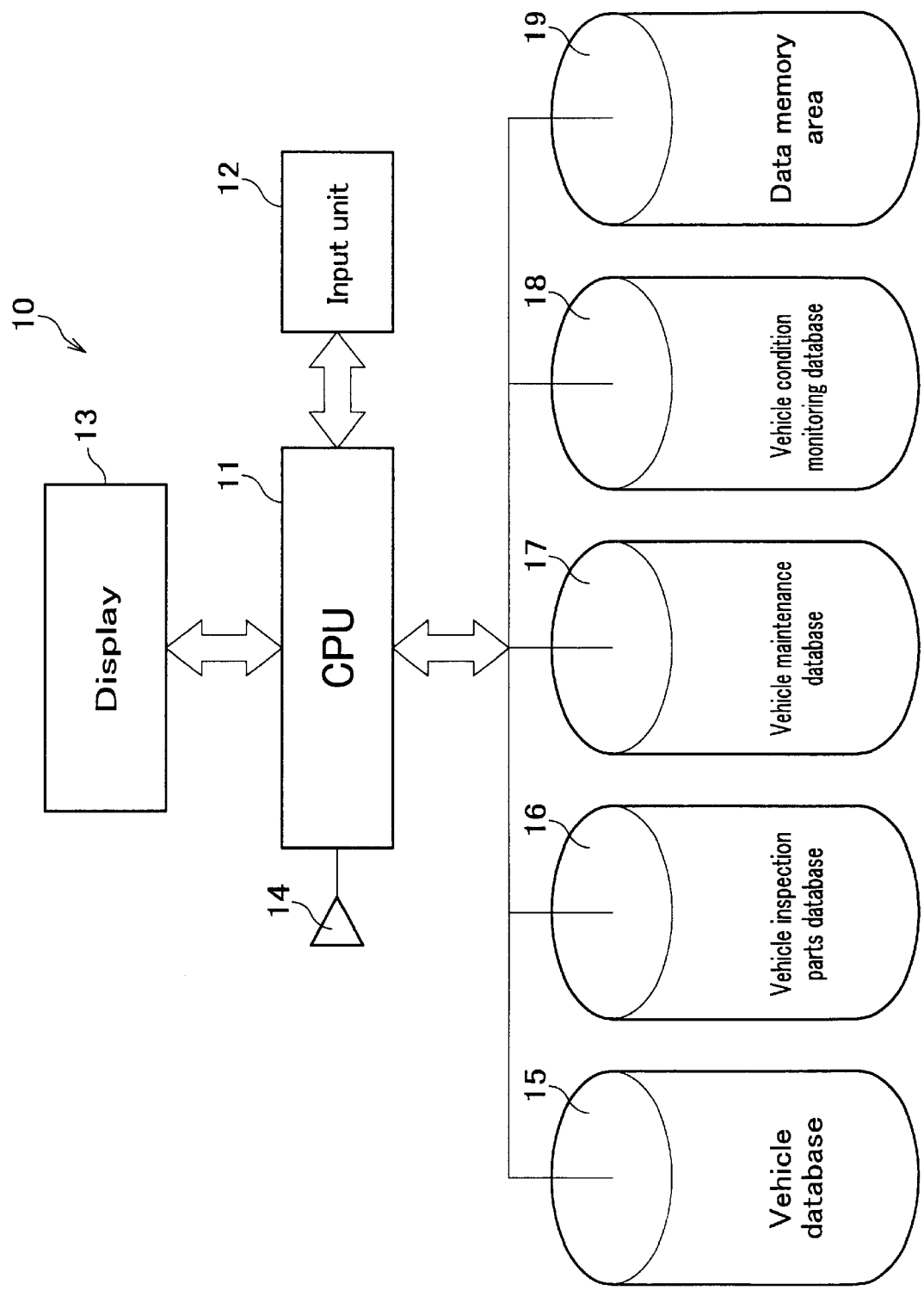
FIG. 7 is a figure showing a business unit implementing the protective maintenance service system of vehicles according to the present invention.

The business unit 1 has processing equipment 10, the structure of which is shown in FIG. 7. The processing equipment 10 has a CPU 11, which performs all computing. To this CPU 11 are connected an input unit 12, a display 13 and a memory unit of various kinds of databases through the bus lines. The input unit 12 performs processing of the processing equipment 10 (data writing and reading). A numeral 14 shows an antenna, by which the business unit 1 communicates with the vehicle mounted unit 20 of the vehicle 2 under the control of the business unit 1, and with the service provider 3.

The memory unit includes: a vehicle data base 15, which stores the information on the vehicle 2 under the control of the business unit 1; a vehicle inspection parts database 16, which stores the list of the parts that require a regular inspection and check, and are used for each vehicle 2 stored in the vehicle database 15; a vehicle maintenance database 17, which stores the information on the history of maintenance such as parts replacement due to degradation; a vehicle condition monitoring database 18, which stores the current conditions of degradation of the parts used for each vehicle 2 transmitted by the service provider 3; and a data memory area 19, which temporarily stores the information transmitted from the service provider 3.

Figure 8:
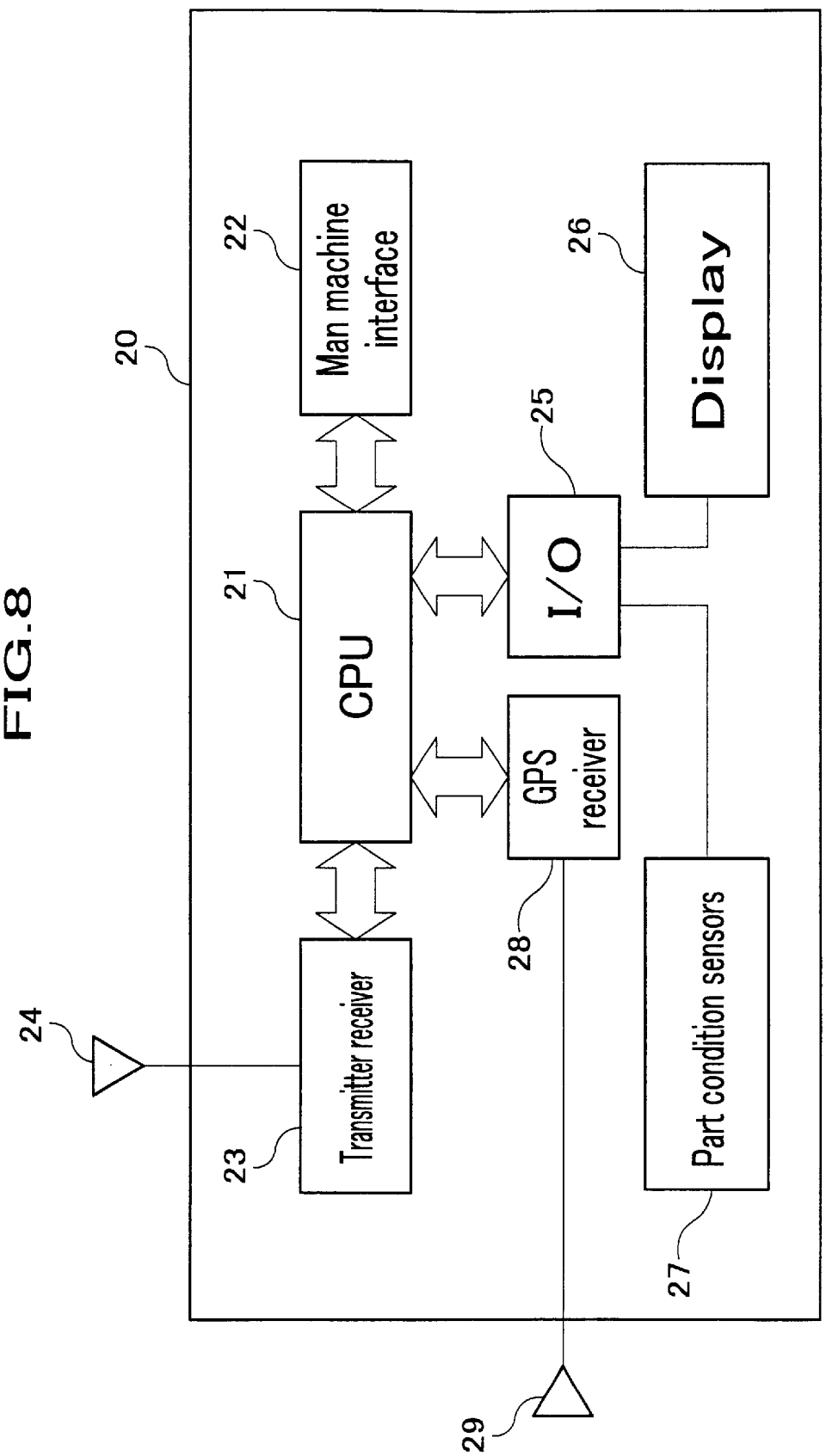
FIG. 8 is a figure showing a vehicle (vehicle mounted unit) implementing the protective maintenance service system of vehicles according to the present invention.

The vehicle mounted unit 20 of the vehicle 2 under the control of the business unit 1 is arranged like FIG. 8. The vehicle mounted unit 20 has a CPU 21, by which all computing is performed. To this CPU 21 are connected a man-machine interface 22 and a transmitter receiver 23 through the bus lines. The man-machine interface 22 is capable of performing the operation (data writing and reading) of the vehicle mounted unit 20. A transmitter receiver 23 is able to transmit the data being input through the man-machine interface 22 and receive the data through an antenna 24 transmitted by the service provider 3. Also an I/O 25 is connected to the CPU 21. To the I/O 25 is connected a display 26, which displays the data being input with the man-machine interface 22 and the data received from the service provider 3, and are connected part condition sensors 27 such as; a velocity sensor, vehicle speed sensor, slip sensor, rain sensor, illuminance sensor, battery sensor, oil sensor, engine temperature sensor, engine revolution sensor, headlamp & fog lamp lighting sensor and cabin temperature sensor. A GPS receiver 28, with which a position signal 9 from a GPS satellite 8 can be received through an antenna 29, is connected to the CPU 21 through a bus line.

Figure 9:
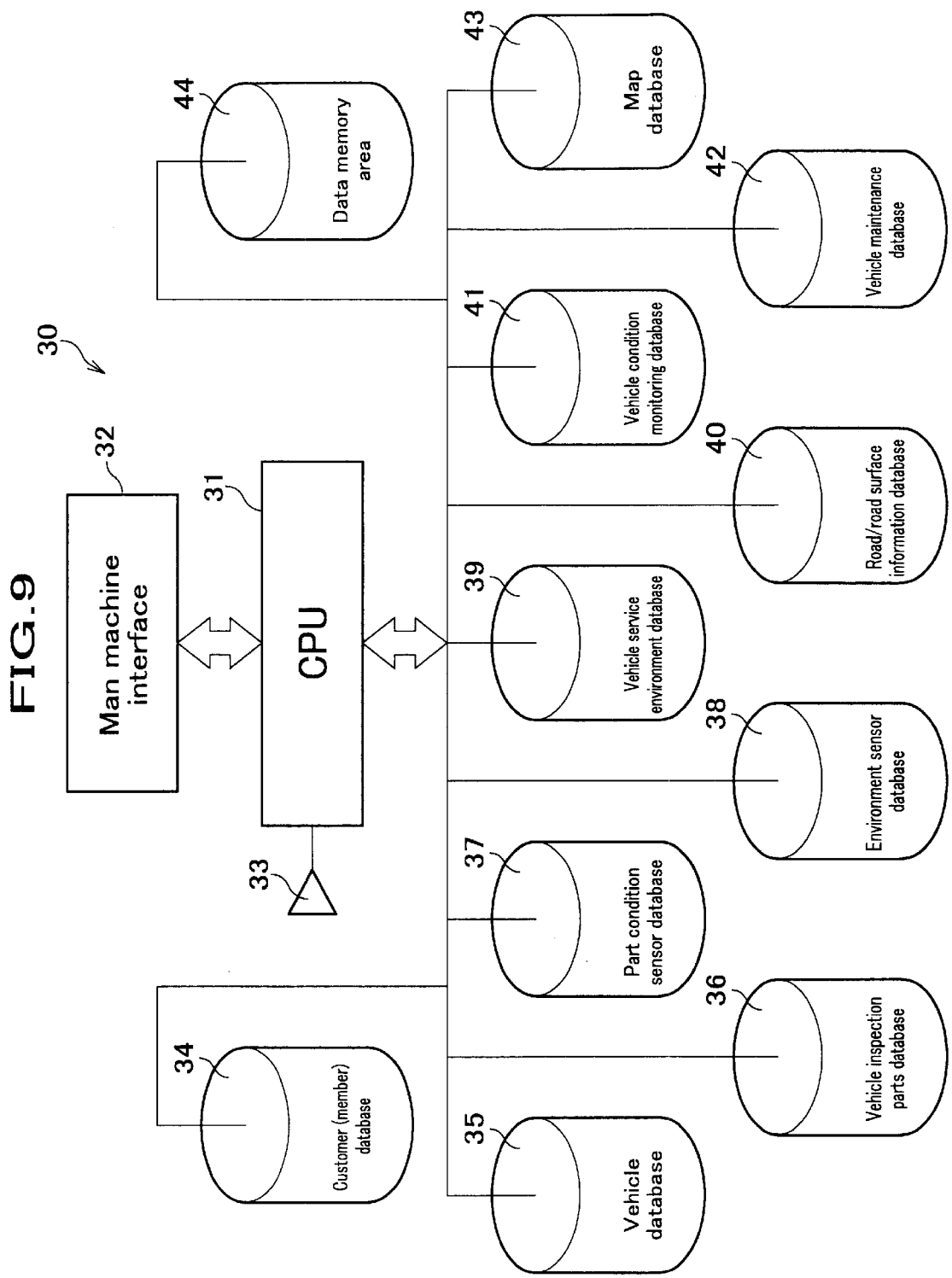
FIG. 9 is a figure showing the processing equipment of a service provider implementing the protective maintenance service system of vehicles according to the present invention.
Figure 16:
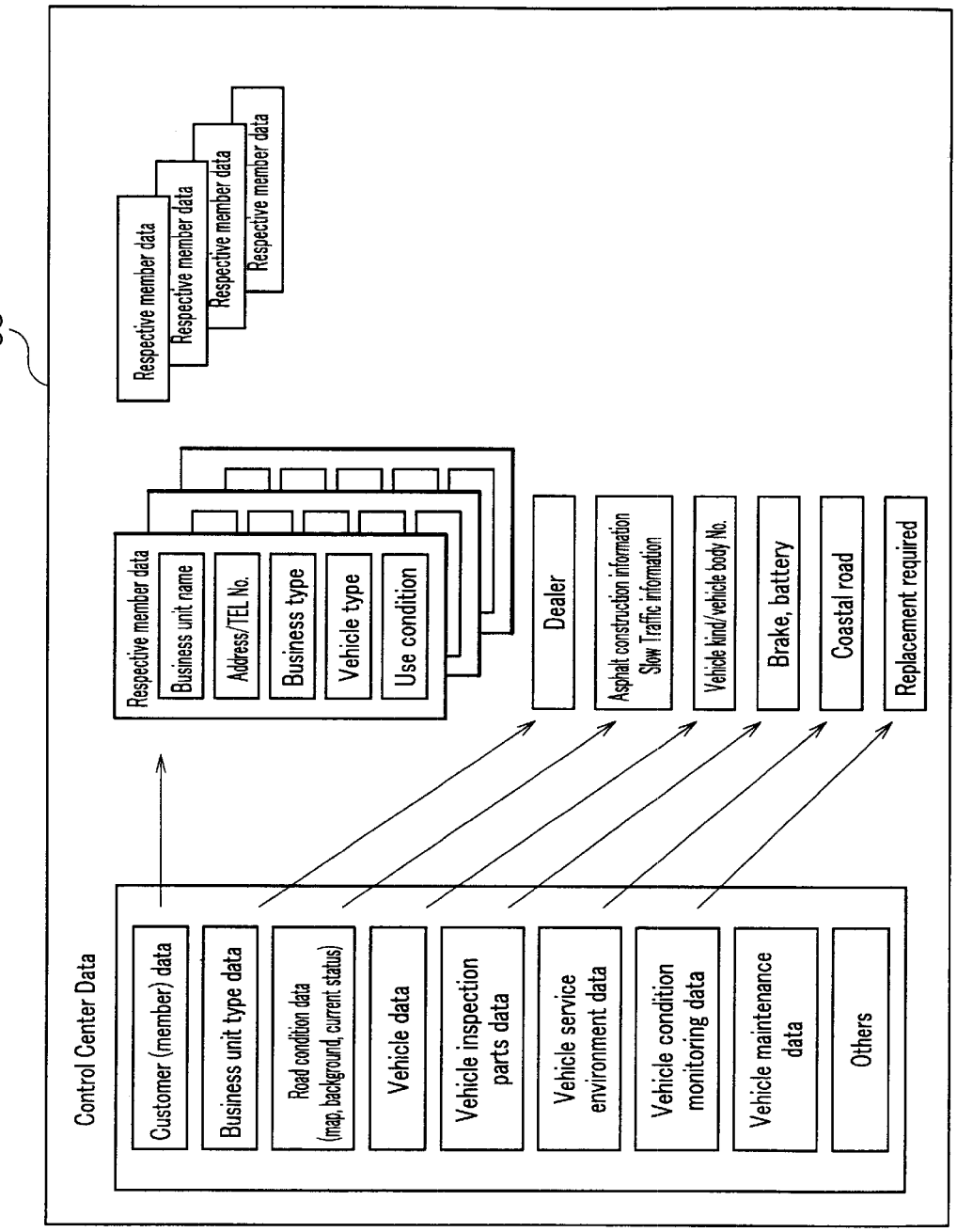
FIG. 16 is a figure showing the member registration card for a member of the protective maintenance service of vehicles.

The service provider 3 has processing equipment 30, which is arranged like FIG. 9. The processing equipment 30 has a CPU 31, by which all computing is performed. To this CPU 31 are connected a man-machine interface 32 through a bus line and a memory unit of various databases (specifically a member information card 50 shown in FIG. 16) through a bus line. The man-machine interface 32 performs the operation of the processing equipment 30 (data writing and reading). A numeral 33 refers to an antenna, by which the service provider 3 communicates with the business unit 1 and the vehicle mounted unit 20 of the vehicle 2 under the control of the business unit 1 through the communication provider 4. The memory unit includes; a customer (member) database 34, a vehicle database 35, a vehicle inspection parts database 36, a part condition sensor database 37, an environment sensor database 38, a vehicle service environment database 39, a road/road surface information database 40, a vehicle condition monitoring database 41, a vehicle maintenance database 42, a map database 43 and a data memory area 44.

The customer (member) database 34 stores the data of the business unit 1 as a database, which makes a contract with the service provider 3, including the name of a business unit, address, occupation, contact address, type of business (transportation company 1A, rental car company 1B, car dealer 1C, taxi company 1D, tourist company 1E).

The vehicle database 35 stores the data (vehicle information), which specifies each vehicle 2 under the control of the customer (the business unit 1) stored in the customer (member) database 34, as a database, including maker name, vehicle kind, type (ex. 4-door hardtop), grade (ex. VIP) and the first registration year and month (ex. Heisei 13 January).

The vehicle inspection parts database 36 stores the respective part data of the inspection required parts as a database, which is used for each vehicle 2 that is under the control of the customer (the business unit 1) and stored in the vehicle database 35. It stores the data of part name, part number, serial number and manufacturing date for the parts such as the tier of a vehicle, headlamp, stop lamp, brake, battery, fuse, winker, engine oil, speedometer, engine revolution sensor and fuel meter.

The part condition sensor database 37 stores the data of sensors as a database, which are mounted on the parts that require a regular monitoring of the conditions of the degradation (directly affecting the vehicle operation) of the inspection required parts of each vehicle 2 stored in the vehicle inspection parts database 36, including a headlamp off sensor, stop lamp off sensor, battery sensor, disconnection sensor, illuminance sensor, cabin temperature sensor, fuel sensor, winker and radiator temperature sensor.

The environment sensor database 38 stores the data of sensors detecting the ambient environment of each vehicle 2 in service as a database, including an ambient temperature sensor, rain sensor and vibration sensor.

The vehicle service environment database 39 stores the environment of the vehicle 2 in service (coastal district, heavy snowfall district, hot district, humid district, mountainous district) as a database.

The road/road surface database 40 stores the information on the road (not asphalted road, climbing hill, serpentine road) and the road surface (gravel road, frozen) of the vehicle 2 in service as a database.

The vehicle condition monitoring database 41 stores the current conditions of the degradation of the parts used for the vehicle 2 as a database.

The vehicle maintenance database 42 stores the information on the maintenance history such as parts replacement due to degradation as a database.

The map database 43 stores the maps throughout a country as a database.

The data memory area 44 temporarily stores the various kinds of information transmitted from the business unit 1 and the vehicle 2.

In the FIGS. 2 through 6, the service provider 3 makes a business contract with the communication provider 4 so that the service provider 3 may use the communication provider 4 serving as communication relay media (communication network/ground wave/satellite) when the service provider 3 communicates with the business unit 1 and the vehicle mounted unit 20 of the vehicle 2 (102). Further, the business unit 1 makes a business contract with the communication provider 4 so that the business unit 1 may use the communication provider 4 serving as communication relay media (communication network/ground wave/satellite) when the business unit 1 communicates with the service provider 3 and the vehicle mounted unit 20 of the vehicle 2 (104). And the business unit 1 makes a business contract with the service provider 3 for receiving the service (106). When the business contract between the business unit 1 and the service provider 3 for the supply of service from the service provider 3 has been made, the service provider 3 will register the customer information in the customer (member) database 34 and prepare a customer card 50 shown in FIG. 16 (108). The data recorded on the customer card 50 include a customer data, business unit type (ex. dealer), road environment data of a vehicle in service (ex. asphalt construction information, Slow Traffic information), vehicle data (ex. vehicle kind/ vehicle body No), vehicle inspection parts data (ex. brake, battery), vehicle service environment data (ex. coastal road), vehicle condition monitoring data (ex. replacement required) and vehicle maintenance data. The customer card 50 corresponds to the memory unit, which is connected to the CPU 31 of the processing equipment 30 of the service provider 3.

Subsequently, the business unit 1 transmits the vehicle data of the vehicle 2 under its control, to the service provider 3 (112) through the communication provider 4 (110). The vehicle 2 varies with the type of the business unit 1: a truck if the business unit 1 is a transportation company, a rental car if the business unit 1 is a rental car company, a passenger car for which it has applied for the automobile inspection certificate if the business unit 1 is a dealer, a taxi if the business unit is a taxi company, or a sightseeing bus if the business unit is a tourist company. This vehicle data includes the communication address of the vehicle 2, which is necessary when the service provider 3 communicates with the vehicle mounted unit 20 of the vehicle 2. Therefore, the communication address of the vehicle 2 is stored, which is included in the vehicle data provided by the business unit 1. The service provider 3 will store the vehicle data of the vehicle 2 under the control of the business unit 1 in the vehicle database 35 of the processing equipment 30, when the service provider 3 receives the vehicle data from the business unit 1 (114).

Further, the business unit 1 transmits the inspection parts data of each vehicle 2 under its control (118) to the service provider 3 through the communication provider 4 (116). The service provider 3 will store the vehicle inspection parts data of each vehicle 2 under the control of the business unit 1 in the vehicle inspection parts database 36 of the processing equipment 30 when the service provider 3 receives the inspection parts data from the business unit 1 (120).

The business unit 1 transmits the data of the part condition sensors 27, which are for monitoring the degradation conditions of the parts mounted on the vehicle 2, to the service provider 3 (124) through the communication provider 4 (122). The service provider 3 stores the data of the part condition sensors 27, which are for monitoring the degradation conditions of the parts mounted on each vehicle 2, in the part condition sensor database 37 of the processing equipment 30, when the service provider 3 receives the data of the part condition sensors 27 from the business unit 1 (126). When the service provider 3 has stored the data of the part condition sensors 27, which are for monitoring the degradation conditions of the parts mounted on each vehicle 2, the service provider 3 will transmit its communication address for the vehicle mounted unit 20 of every vehicle 2 under the control of the business unit 1 (128).

When the service provider 3 has transmitted the communication address for every vehicle 2 under the control of the business unit 1, the communication address of the service provider 3 will be stored in the internal memory of the CPU 11 of the vehicle mounted unit 20 (130).

The business unit 1 transmits the data of the environment sensors, which are for monitoring the environment of the vehicle 2 in service (snow fall, rain fall), through the communication provider 4 (132) to the service provider 3 (134). The service provider 3 will store the data of the environment sensors mounted on the vehicle 2 under the control of the business unit 1 in the environment sensor database 38 of the processing equipment 30, when the service provider 3 receives the data of the environment sensors (136).

The business unit 1 transmits the conditions (criteria) for determining the degradation of the respective inspection required parts used for the vehicle 2 through the communication provider 4 (138) to the service provider 3 (140). The service provider 3 will store the criteria of degradation in the database of the processing equipment 30, when the service provider 3 receives the conditions (criteria) for determining the degradation of the inspection required parts used for the vehicle 2 (142).

Thus, the vehicle 2 transmits the data (battery conditions etc.) obtained from the part condition sensors 27 to the service provider 3 (144). The service provider 3 stores the data (battery conditions etc.) obtained from the part condition sensors 27, which is transmitted by the vehicle 2, in the part condition sensor database 37 (146). The vehicle 2 transmits the data of the environment sensors, which are for monitoring the vehicle service environment (snow fall, rain fall etc.), to the service provider 3 (148). The service provider 3 stores the data obtained from the environment sensors, which is transmitted by the vehicle 2, in the environment sensor database 38 (150).

The vehicle 2 receives the radio waves of a plurality of GPS satellites through the antenna 29 with the GPS receiver 28 and computes the position of the vehicle 2, which is transmitted to the service provider 3 (152). When the service provider 3 receives the position data of the vehicle 2, it will search for the current environment of the vehicle 2 in service on the basis of the position data of the vehicle 2, utilizing the information of the environment sensor database 38 of the service provider 3, in which the vehicle service environments having been collected from each vehicle 2 are stored, if the vehicle 2 is currently in service (running). And the current environment of the vehicle 2 in service is stored in the vehicle service environment database 39 of the processing equipment 30 (154). The service provider 3 determines whether or not a part has been degraded on the basis of the data detected by one of the part condition sensors 27, of the parts which are continuously monitored by the part condition sensors 27 (156). The service provider 3 determines whether or not a part has been degraded of the parts, which are not monitored by the part condition sensors 27, by compensating the service life of the part used for the vehicle 2. The compensation is made in such a manner that the data obtained by the environment sensors mounted on the vehicle 2 and the compensation value based on the probe information of the vehicle service environment obtained from the various vehicles are incorporated into the service life, which is set for the part according to its inherent service life (158).

In this connection, the business unit 1 makes an inquiry about the respective conditions of the degradation of the inspection required parts used for each vehicle 2 through the communication provider 4 (160) for the service provider 3 (162). When the business unit 1 makes an inquiry about the respective conditions of the degradation of the inspection required parts used for each vehicle 2, the service provider 3 will send a response about the respective conditions of the degradation, asked by the business unit 1, through the communication provider 4 (164) to the business unit 1 (166).

The vehicle 2 transmits the data obtained from the part condition sensors 27 to the service provider 3 regularly (168). When the service provider 3 receives the data obtained from the part condition sensors 27 regularly, it will store the data in the part condition sensor database 37 for each reception (170).

The vehicle 2 transmits the environment data obtained from the environment sensors to the service provider 3 regularly (172). When the service provider 3 receives the environment data obtained from the environment sensors from the vehicle 2 regularly, it will store the data in the environment sensor database 38 for each reception (174).

The service provider 3 performs the degradation judgment of a part with the data detected by one of the part condition sensors 27 for the parts, which are continuously monitored by the part condition sensors 27 (176). The service provider 3 searches for a part to require replacement according to the conditions of the degradation of the part on the basis of the degradation judgment with the data detected by one of the part condition sensors 27, for the parts which are continuously monitored by the part condition sensors 27 (178). In addition, the service provider 3 searches the parts without the part condition sensors 27 for any of them to reach the service lives (180).

The service provider 3 searches for a part to require replacement, on the basis of the degradation judgment of the part with the data detected by one of the part condition sensors 27 for the parts, which are continuously monitored by the part condition sensors 27, or on the basis of the service lives for the parts, which are not monitored by the part condition sensors 27. Then the service provider 3 informs the business unit 1 of the parts needed to replace of the inspection required parts mounted on the vehicle 2 (184) through the communication provider 4 (182). The business unit 1 will register the parts needed to replace of the inspection required parts mounted on each vehicles 2 when it is informed of the parts needed to replace by the service provider 3 (186).

The service provider 3 sends an alarm with the direction of replacement for the parts needed to replace of the inspection required parts to the vehicle 2 (the vehicle mounted unit 20) (188). The vehicle 2 (the vehicle mounted unit 20), which has received the alarm for the replacement of the inspection required parts needed to replace, will display the direction of replacement The service provider 3 determines a compensation value based on an inherent service life, the data obtained from the environment sensors mounted on the vehicle 2 and the probe information obtained from the various kinds of vehicles for the respective parts, which are not monitored by the part condition sensors 27. The service provider 3 performs the degradation judgment on a part by compensating the service life of the part with the compensation value, for the parts which are not monitored by the part condition sensors 27 mounted on the vehicle 2. Then the service provider 3 computes the predicted replacement time for the respective parts, which are not equipped with the part condition sensors 27 mounted on the vehicle 2, on the basis of the degradation judgment (192). The predicted replacement time computed for the respective parts, which are not equipped with the part condition sensors 27, is sent through the communication provider 4 (194) to the business unit 1 (196).

The business unit 1, which has received the predicted time of replacement for the respective parts without the part condition sensors 27, stores and registers the replacement time data of the respective parts in the vehicle condition monitoring database 18 (198). Thus the replacement time data of the respective parts without the part condition sensors 27 is updated. Further, the inspection-maintenance notice data for noticing the time of inspection-maintenance according to the replacement time data of respective parts without the part condition sensors 27 is registered in the vehicle condition monitoring database 18 (200). The vehicle 2 undergoes inspection-maintenance according to the inspection-maintenance notice data registered in the vehicle condition monitoring database 18 (202).

Directly from the vehicle 2 the business unit 1 receives the vehicle data stored by the vehicle 2, when the business unit 1 conducts the inspection-maintenance of the vehicle 2 (204). The business unit 1 makes an inquiry about the conditions of degradation of the inspection required parts mounted on the vehicle 2, the vehicle data of which the business unit 1 has received, through the communication provider 4 (206) for the service provider 3 (208). When the service provider 3 receives the inquiry about the conditions of degradation of the inspection required parts of the vehicle 2, it makes a response to the inquiry through the communication provider 4 (210) to the business unit 1 (212).

The business unit 1, which has received the response about the conditions of degradation of the inspection required parts of the vehicle 2 from the service provider 3, displays the list which shows the inspection required parts used for the vehicle 2 to undergo the inspection-maintenance (214). The business unit 1 displays the lists of the parts, which need to be replaced in the current inspection-maintenance of all the inspection required parts listed in the preceding step (216). The business unit 1 replaces the parts needed to replace of the inspection required parts used for the vehicle 2 according to the list of replacement needed parts (218). The replacement of the parts needed to replace is conducted for the vehicle 2 (220). When the replacement of the parts needed to replace has been conducted, the business unit 1 will register (store) the parts having been replaced in the vehicle maintenance database 17 (222).

When the business unit 1 has conducted the replacement of the parts needed to replace according to the conditions of degradation of the inspection required parts of the vehicle 2 at the inspection-maintenance of the vehicle 2, it will inform the service provider 3 of all the replaced parts (226) through the communication provider 4 (224). The service provider 3, which has received the notice of all the replaced parts from the business unit 1, registers (stores) the maintenance data of the conducted inspection-maintenance in the vehicle maintenance database 17 (228). Of the inspection required parts, whose data (service life etc.) is stored, mounted on the vehicle 2, the parts data (service life etc.) of the replaced parts in the inspection-maintenance is updated (230).

The flow of the customer (member) registration of the business unit 1 will be described, referring to FIG. 10.

Figure 10:
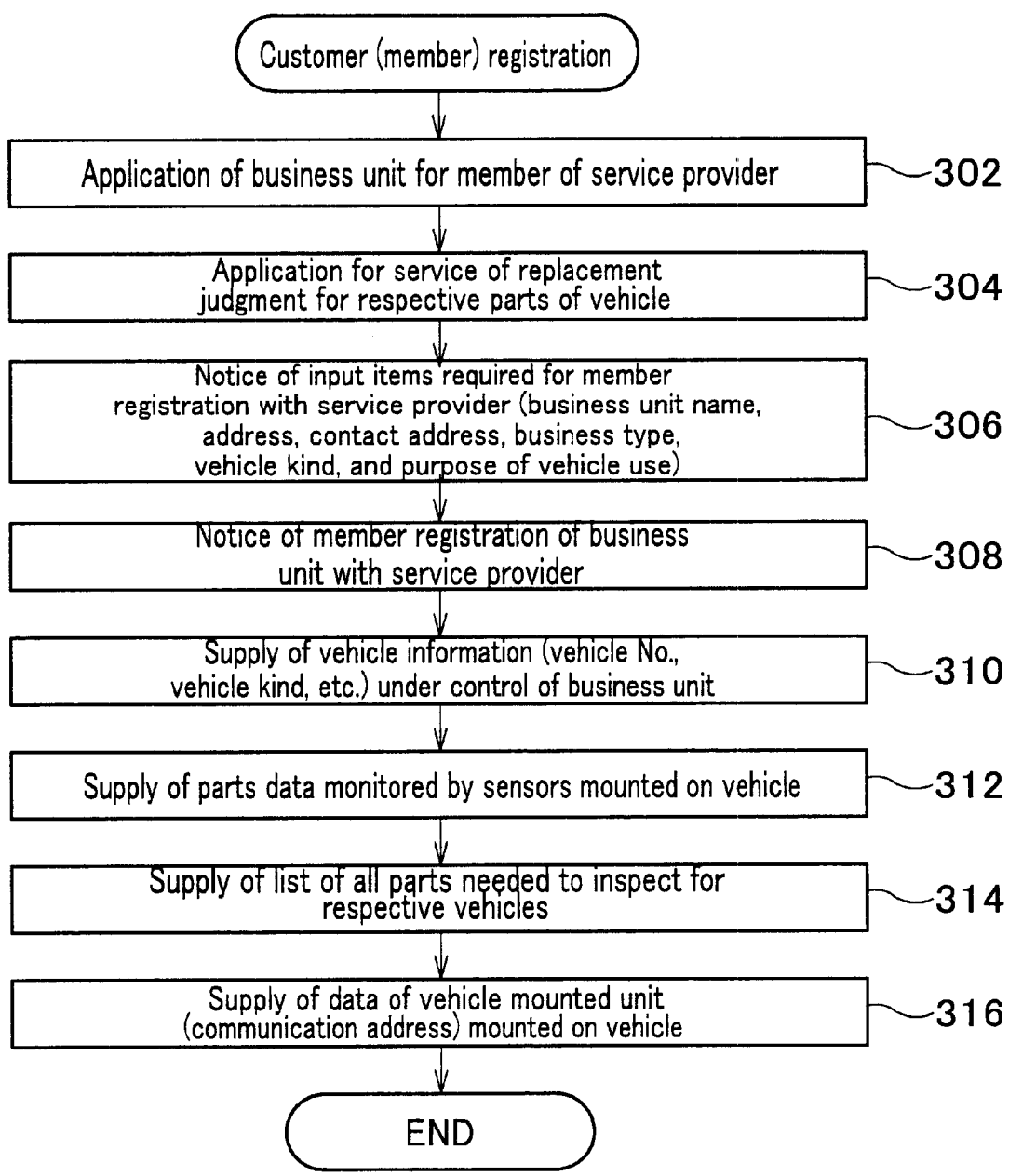
FIG. 10 is a flow chart showing the member registration when starting the protective maintenance service system of vehicles according to the present invention.
Figure 17:
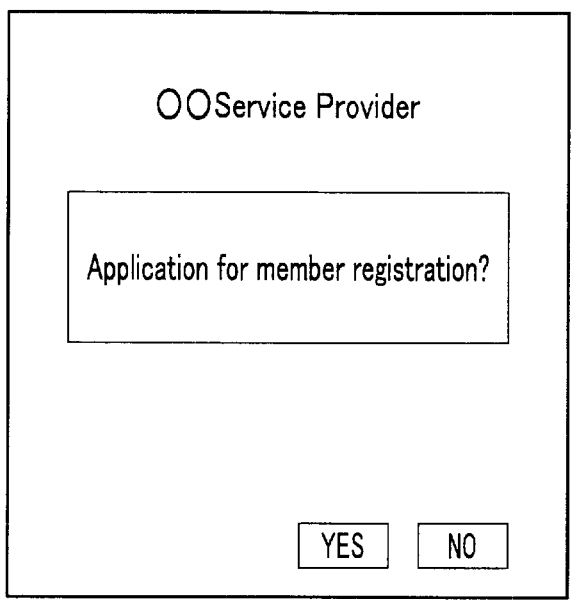
FIG. 17 is a figure showing the display page of application of member registration for a member of the protective maintenance service of vehicles.
Figure 18:
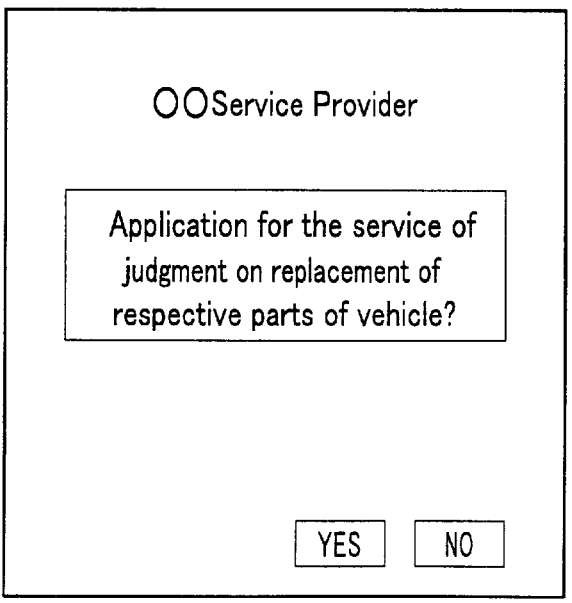
FIG. 18 is a figure illustrating the display page for setting the contents of the protective maintenance service of vehicles.

As shown in FIG. 10, when the business unit 1 intends to start the protective maintenance service of vehicles by the service provider 3, the business unit 1, first in step 302, calls the service provider 3 and reaches the display page of member registration shown in FIG. 17. The business unit 1 clicks 'YES' and makes an application for the member registration following the application for the member registration displayed on the page shown in FIG. 17. When the business unit 1 makes an application for the member registration in this step 302, another display page shown in FIG. 18 which specifies the contents of service provided by the service provider 3 is transmitted to the business unit 1 in step 304. The business unit 1 clicks 'YES' and makes an application for the service of determination of the time of replacement of the parts mounted on each vehicle 2 under the control of the business unit 1 and noticing the time of replacement, namely the service of the judgment on replacement of the respective vehicle parts in step 304. This registration will specify the contents of service provided by the service provider 3.

When the business unit 1 has made an application for the service of the judgment of replacement of the respective vehicle parts in step 304, the input display page of items necessary for the member registration (business unit name, address, contact address, business type, vehicle type, purpose of vehicle use, etc.) shown in FIG. 19, namely the following message display page to specify a member will be transmitted.

Please input the following items:
1. Business unit name
2. Address
3. Business type
4. Telephone No.
5. Capital
6. Number of vehicles
7. Others When the message display page is transmitted, the business unit 1 receives the input items in step 306. In step 306 the business unit 1, which has received the request for the input items, makes the input for these items. The service provider 3 receives the input display page, which is filled with the necessary input data, and makes the input for member registration (assignment of member No.), preparing a member registration card 50 shown in FIG. 16. Then the service provider 3 makes a member registration and assigns an ID code as a member by storing the input items necessary for member registration in the member database 34 shown in FIG. 9. When the input of items necessary for member registration and the assignment of an ID code are completed, the service provider 3 will transmit the notification of member registration to the business unit 1 in step 308. The transmitted display page shown in FIG. 20 is as follows:

You have been registered as a member.
Your member No. and ID code are:
Member No.: XXXXX
ID code: YYYYY When the business unit 1 receives the transmission of member registration from the service provider 3, a message display page will be transmitted from the service provider 3 to inquire about the vehicle information (vehicle No., vehicle kind, etc.) shown in FIG. 21. The message display page requests the information on a vehicle, with which the protective maintenance service of vehicles is to be applied:

Please input the following items:
1. Vehicle control No.
2. Maker name
3. Vehicle kind
4. Vehicle grade
5. Vehicle type
6. Cubic capacity
7. First registration year and month
8. Registration No.
9. Total mileage
10. Others The vehicle control No. of the message display page shown in FIG. 21 is a vehicle No., which the business unit 1 assigns to identify the vehicle 2 under its control. The maker name is a vehicle manufacturer such as Japanese, US and French manufacturers, etc. The vehicle kind is a name, which each manufacturer gives to its vehicle. The vehicle grade is a rank, which each manufacturer gives to its vehicle to differentiate the vehicles of a name. The type of vehicle shows the characteristic of a vehicle such as 4-door hardtop etc. The cubic capacity is the engine cubic capacity shown on a vehicle by each manufacturer such as 3000 CC. The first registration year and month is the year and month when a vehicle is first registered at the land transportation bureau such as Heisei 13 June. The registration No. is the registered No., year and month, which is on the number plate of a vehicle, such as 'Nerima 33 He 12-34'. The total mileage is the total distance, which a vehicle has run so far and is read on the speedometer. The business unit 1 makes the input for the vehicle information form in step 310 transmitted from the service provider 3, thereby supplying the information on the vehicle 2 under the control of the business unit 1.

When the business unit 1 has made the input of the vehicle information in step 310, the service provider 3 will transmit a message display page shown in FIG. 22 requesting the parts, which are continuously monitored by the part condition sensors 27, of the various parts used for the vehicle 2 under the control of the business unit 1, with which protective maintenance service of vehicles is to be applied. The display page is as follows:

Please input the parts monitored by the part condition sensors.
1.
2.
3.
4.
5.
6.

The business unit 1 inputs the information of parts, which are continuously monitored by the part condition sensors 27, according to the message display page transmitted by the service provider 3 in step 312 as follows:

Please input the parts monitored by the part condition sensors.
1. AAA
2. BBBB
3. CCCC
4. DEDE
5. FGFG
6. HIHI When the business unit 1 has input the information of the parts, which are continuously monitored by the part condition sensors 27, in step 312, the service provider 3 will transmit a message display page requesting the list of all the parts, which are used for the vehicle 2 to have the protective maintenance service of vehicles and require the inspection at the inspection-maintenance.

Please input the list of inspection required parts.
1.
2.
3.
4.
5.
6.

The business unit 1 inputs the list of all the parts, which are used for the vehicle 2 and require the inspection at the inspection-maintenance, according to the message display page transmitted by the service provider 3 in step 314 as shown FIG. 23.

Please input the list of inspection required parts.
1. ABAB
2. CDCD
3. EFEF
4. GHIH
5. JKLJ
6. MNOO When the business unit 1 has input the list of all the parts, which are used for the vehicle 2 and require the inspection at the inspection-maintenance, transmitted from the service provider 3, the business unit 1 will provide the service provider 3 with a communication address, which is stored in the transmitter receiver 23 of the vehicle mounted unit 20 of the vehicle 2. Thus the business unit 1 completes the process of member registration with the service provider 3.

When the business unit 1 has the protective maintenance service of vehicles, the process of the business unit 1 relative to the service provider 3 will be described referring to FIG. 11.

Figure 11:
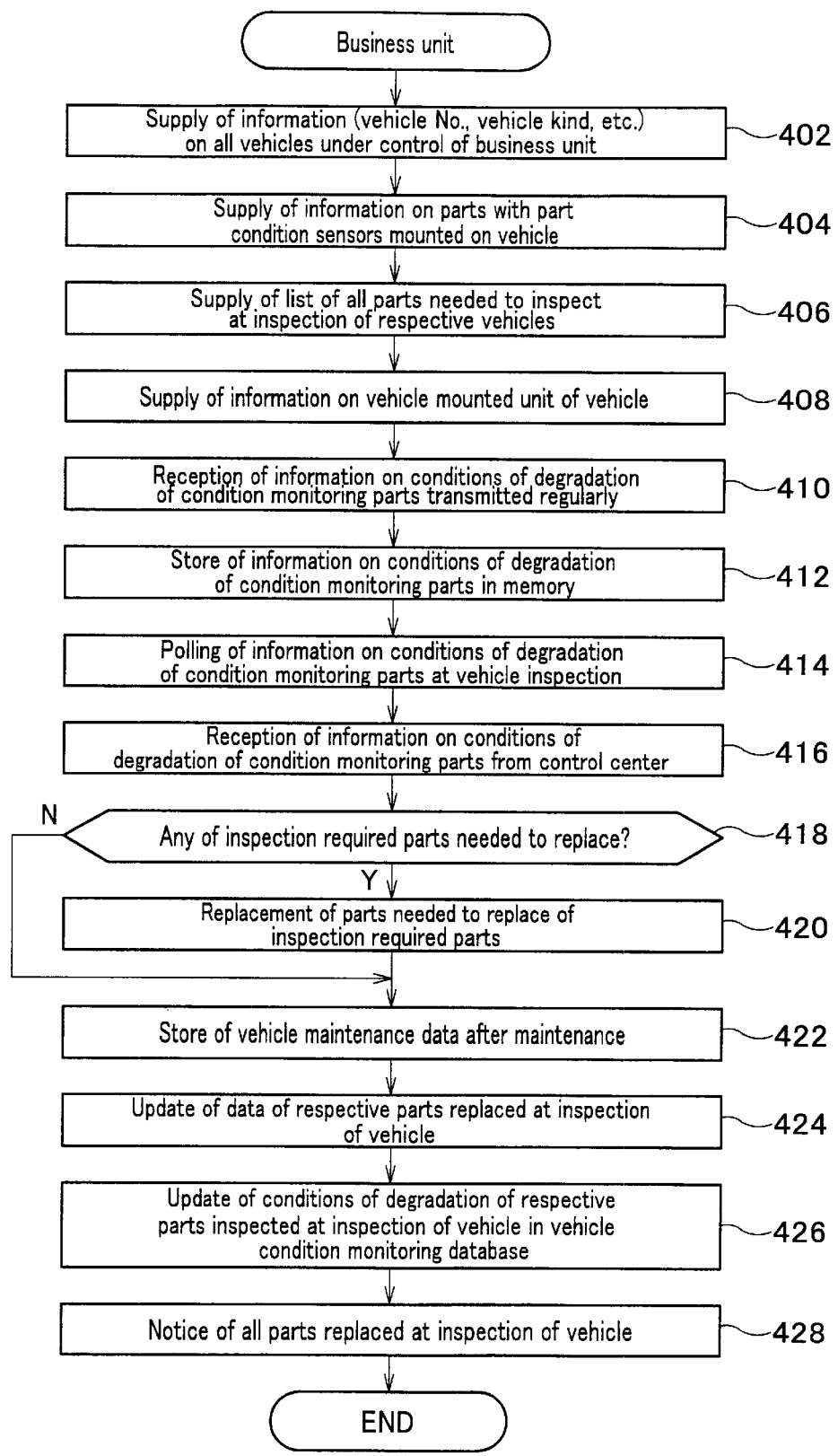
FIG. 11 is a flow chart showing the process of a business unit implementing the protective maintenance service system of vehicles according to the present invention.

In FIG. 11, the business unit 1 supplies the information (vehicle No., vehicle kind, etc.) on every vehicle 2 under the control of the business unit 1 in step 402. After the business unit 1 supplies the information (vehicle No., vehicle kind, etc.) on every vehicle 2 under the control of the business unit 1 in step 402, the business unit 1 supplies the information on the parts, which are continuously monitored by the part condition sensors 27, of the various parts used for each vehicle 2 under the control of the business unit 1 in step 404. After the business unit 1 supplies the information (parts condition data) of the parts in step 404, the conditions of good or bad (the conditions of degradation) of which are continuously monitored by the part condition sensors 27, the business unit 1 supplies the list of all the parts in step 406, which require the inspection at the inspection-maintenance. After the business unit 1 supplies the list of all the parts in step 406, which require the inspection at the inspection-maintenance, the business unit 1 supplies the communication address (information on the vehicle mounted unit 20) in step 408, which is stored in the transmitter receiver 23 of the vehicle mounted unit 20 of each vehicle 2 under the control of the business unit 1.

The business unit 1 receives the information on the appropriate conditions (the conditions of degradation) of the inspection required parts (condition monitor parts), which is transmitted by the service provider 3 regularly (periodically). After step 410, the business unit 1 stores the information in the vehicle condition monitoring database 18 of the processing equipmentlo of the business unit 1 in step 412 and utilizes it for continuous monitoring of the information on the appropriate conditions (the conditions of degradation) of the inspection required parts (condition monitor parts).

When the inspection-maintenance of the vehicle 2 under the business unit 1 is performed, the business unit 1 conducts a polling of the information on the appropriate conditions (the conditions of degradation) of the inspection required parts (condition monitor parts) for the service provider 3 in step 414. When the information on the appropriate conditions (the conditions of degradation) of the inspection required parts (condition monitor parts) is transmitted back from the service provider 3 responding the polling, the business unit 1 receives it in step 416. After step 416, the business unit 1 determines if there are any of the inspection required parts (condition monitor parts) in step 418, which need to be replaced.

If the business unit 1 determines that there are some of the inspection required parts (condition monitor parts) that need to be replaced in step 418, the business unit 1 conducts the replacement of parts, which need to be replaced, of the parts inspected at the inspection-maintenance of the vehicle 2 under the control of the business unit 1 in step 420. After the replacement has been conducted in step 420 or it has been determined there are no parts needed to replace in step 418, the business unit 1 stores the conditions of maintenance of the respective parts (vehicle maintenance data) in the vehicle maintenance database 17 of the processing equipment 10 of the business unit 1 after the completion of the maintenance in step 422.

After step 422, the business unit 1 updates the parts data (service lives, etc.) of the parts in step 424, which have been replaced at the inspection-maintenance. After step 424, the business unit 1 updates the appropriate conditions (the conditions of degradation) of the respective parts, which have been inspected at the inspection-maintenance of each vehicle 2, in the vehicle condition monitoring database 18 of the processing equipmentlo of the business unit 1 in step 426. After step 426, the business unit 1 informs the service provider 3 of all the parts in step 428, which have been replaced at the inspection-maintenance of each vehicle 2, thereby completing the flow.

The process flow of the vehicle 2 (the vehicle mounted unit 20) when the business unit 1 has the protective maintenance service of vehicles from the service provider 3 will be described referring to FIG. 12.

Figure 12:
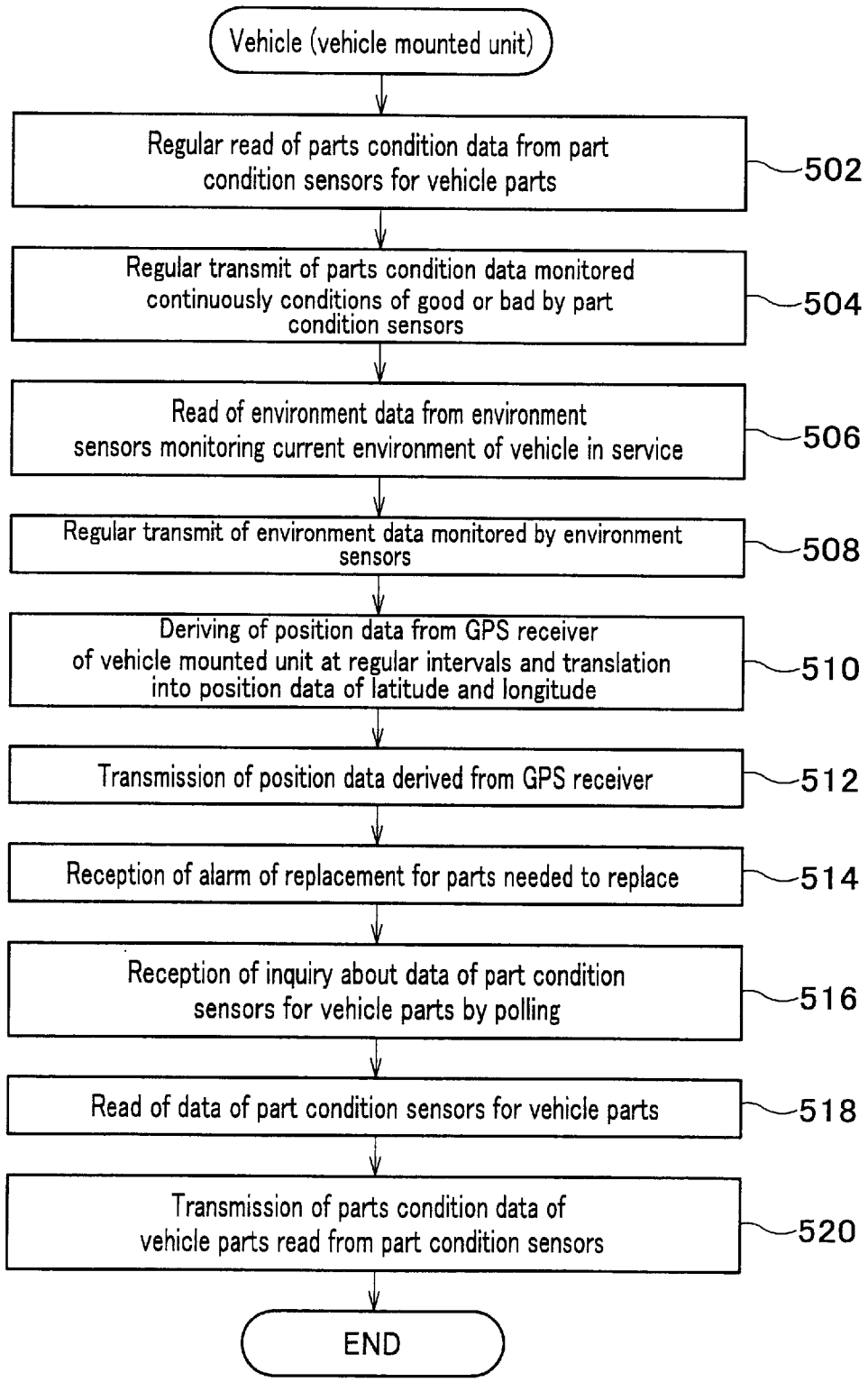
FIG. 12 is a flow chart showing the process of a vehicle (vehicle mounted unit) implementing the protective maintenance service system of vehicles according to the present invention.

In FIG. 12, the vehicle 2 (the vehicle mounted unit 20) regularly reads the parts condition data obtained from the part condition sensors 27 mounted on the vehicle parts, which require the continuous monitoring of the conditions of good or bad (conditions of degradation) of parts of the vehicle 2 in step 502. After step 502, the vehicle 2 (the vehicle mounted unit 20) regularly transmits the parts condition data, which have been read regularly, to the service provider 3 in step 504. After step 504, the vehicle 2 (the vehicle mounted unit 20) reads the environment data obtained from the environment sensors, which are mounted on the vehicle 2 and monitor the current ambient environment (weather, temperature, humidity, road conditions, etc.) of the vehicle 2 in service in step 506. After step 506, the vehicle 2 (the vehicle mounted unit 20) regularly transmits the environment data monitored by the environment sensors mounted on the vehicle 2 in step 508.

After step 508 in which the vehicle 2 (vehicle mounted unit 20) regularly transmits the environment data monitored by the environment sensors, the vehicle 2 (the vehicle mounted unit 20) derives the position data from the GPS receiver 28 of the vehicle mounted unit 20 at regular intervals and translates it into the position data of latitude and longitude in step 510. After step 510, the vehicle 2 (the vehicle mounted unit 20) transmits the position data of latitude and longitude translated from the position data obtained from the GPS receiver 28 of the vehicle mounted unit 20 to the service provider 3 at regular intervals in step 512.

The service provider 3 computes the time of replacement of a part with the information of the appropriate conditions (the conditions of degradation), which has been derived through the computational process, of the inspection required parts (condition monitor parts), and transmits an alarm of replacement for the vehicle parts, which should be replaced, of the inspection required parts used for the vehicle 2. And the vehicle 2 (the vehicle mounted unit 20) receives the alarm of replacement in step 514, which is shown on the display 26 of the vehicle mounted unit 20 of the vehicle 2.

The service provider 3 makes an inquiry for the vehicle 2 (the vehicle mounted unit 20) about the data of parts conditions obtained from the part condition sensors 27, which continuously monitor the conditions of good or bad (the conditions of degradation) of the inspection required parts of the vehicle 2, by conducting a polling. When there is polling from the service provider 3, the vehicle 2 (the vehicle mounted unit 20) receives the inquiry about the data of parts conditions obtained from the part condition sensors 27 by polling in step 516. After step 516, the vehicle 2 (the vehicle mounted unit 20) reads the data of parts conditions obtained from the part condition sensors 27 in step 518, which continuously monitor the conditions of good or bad (the conditions of degradation) of the inspection required parts of the vehicle 2. After step 518, the vehicle 2 (the vehicle mounted unit 20) transmits the data of parts conditions, which has been read regularly, to the service provider 3 in step 520, thereby completing the flow.

Figure 14:
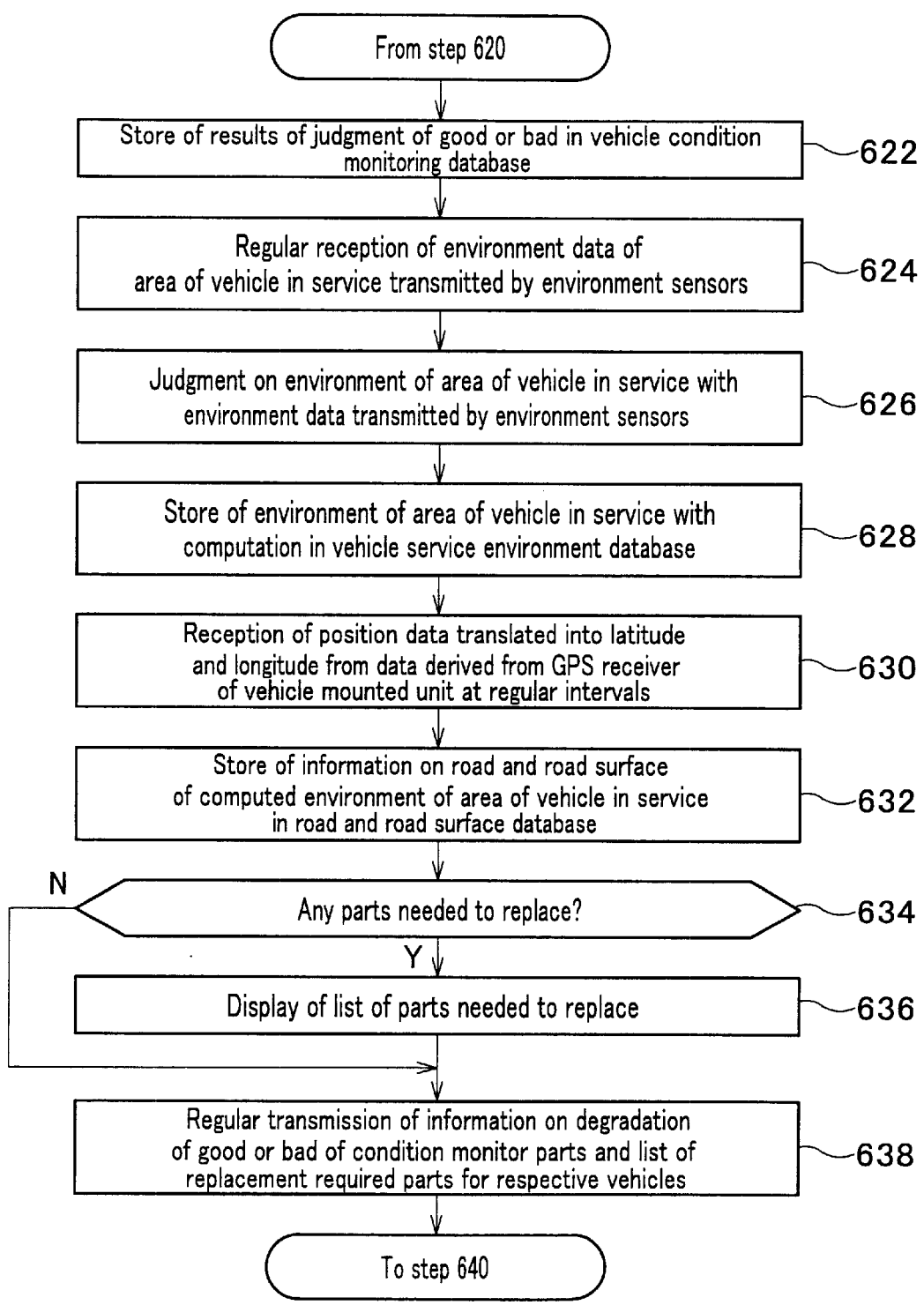
FIG. 14 is a flow chart showing the process of a service provider implementing the protective maintenance service system of vehicles according to the present invention.
Figure 15:
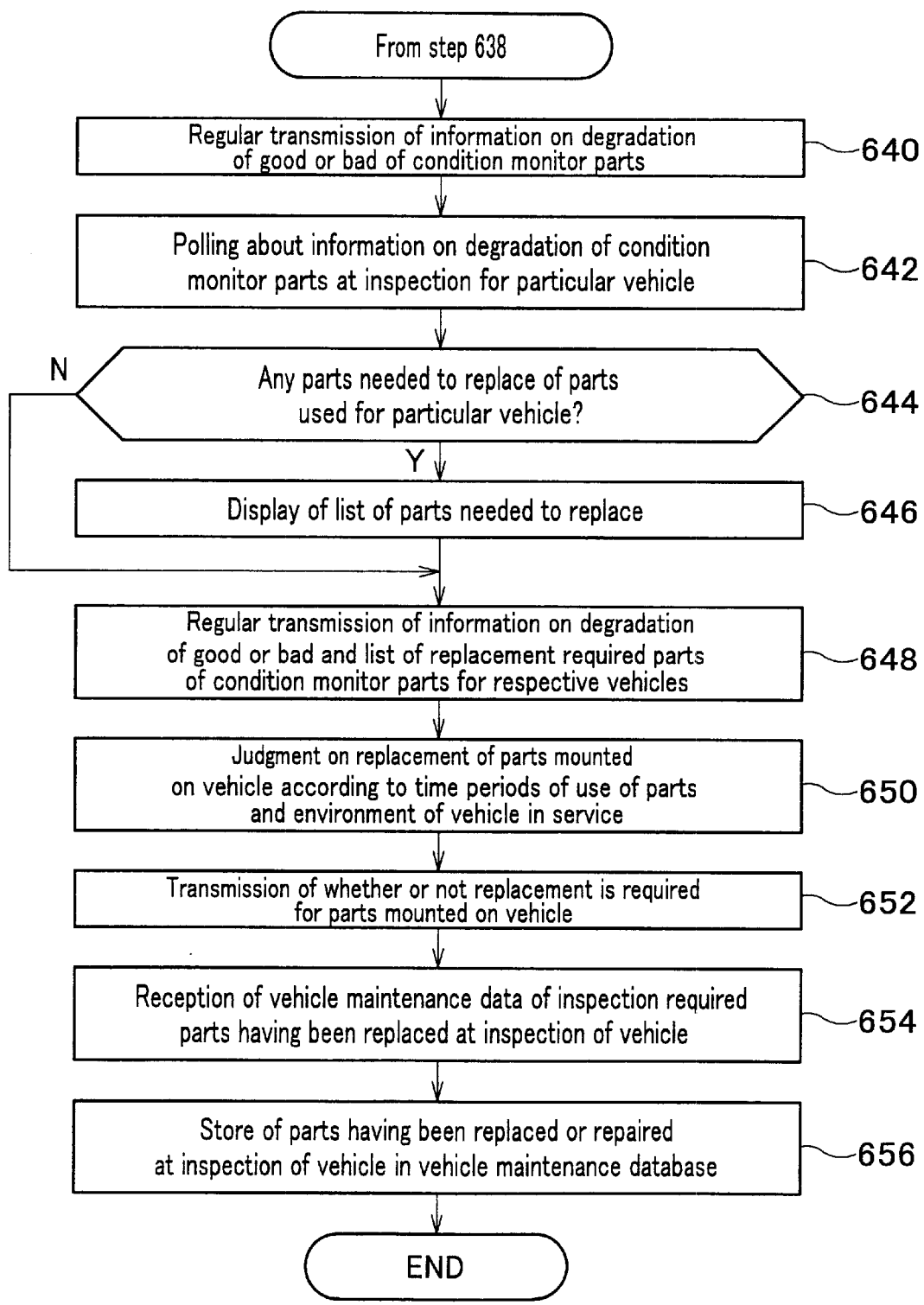
FIG. 15 is a flow chart showing the process of a service provider implementing the protective maintenance service system of vehicles according to the present invention.

The process flow of the service provider 3 when the business unit 1 has the protective maintenance service of vehicles by the service provider 3 will be described referring to FIGS. 13 through 15.

Figure 13:
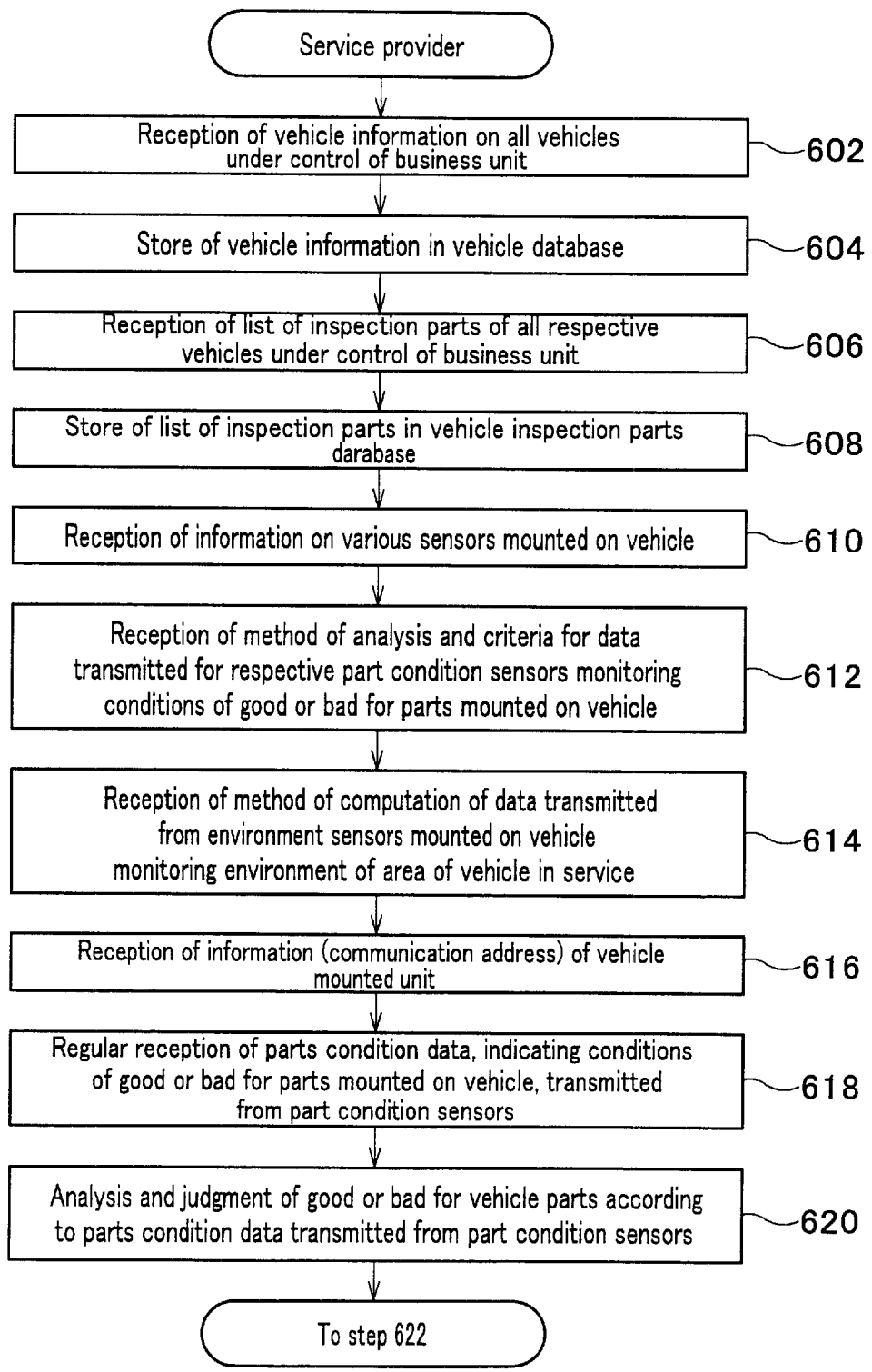
FIG. 13 is a flow chart showing the process of a service provider implementing the protective maintenance service system of vehicles according to the present invention.

In FIG. 13, the service provider 3 receives the vehicle information on every vehicle 2 under the control of the business unit 1 from the business unit 1 in step 602. After step 602, the service provider 3 stores the vehicle information transmitted by the business unit 1 in the vehicle database 35 of the processing equipment 30 in step 604. After step 604, the service provider 3 receives the list of inspection parts of each vehicle 2 under the control of the business unit 1 in step 606, which is transmitted by the business unit 1. After step 606, the service provider 3 stores the list of inspection parts of each vehicle 2 transmitted by the business unit 1 in the vehicle inspection parts database 36 of the processing equipment 30 in step 608.

After step 608, the service provider 3 receives the information on the part condition sensors 27 mounted on each vehicle 2 under the control of the business unit 1 in step 610. After step 610, the service provider 3 receives the method of analysis and criteria for the data (parts condition data) transmitted for the respective part condition sensors 27, which continuously monitor the conditions of good or bad for the particular parts mounted on the vehicle 2, from the business unit 1 in step 612. After step 612, the service provider 3 receives the method of computation of the data (environment data) transmitted from the respective environment sensors mounted on the vehicle 2, which monitor the environment of the area (the vicinity) of the vehicle 2 in service, from the business unit 1 in step 614. After step 614, the service provider 3 receives the information (communication address) of the vehicle mounted unit 20 mounted on the vehicle 2, thus enabling the communication between the service provider 3 and the vehicle mounted unit 20.

After step 616, in step 618, the service provider 3 regularly receives the parts condition data, which is obtained from the part condition sensors 27 of the vehicle mounted unit 20 and transmitted by the transmitter receiver 23 regularly, indicating the conditions of good or bad for the parts, which are continuously monitored by the part condition sensors 27 mounted on the vehicle 2. After step 618, the service provider 3 performs an analysis and judgment of good or bad for the vehicle parts, which are continuously monitored by the part condition sensors 27, according to the received parts condition data in step 620. After step 620, the service provider 3 stores the results of the judgment of good or bad in the vehicle condition monitoring database 41 of the processing equipment 30 in step 622.

The service provider 3 regularly receives the environment data of the area (the vicinity) of the vehicle 2 in service transmitted by the environment sensors in step 624. After step 624, the service provider 3 makes a judgment on the environment of the area (the vicinity) of the vehicle 2 in service with the computation and analysis in step 626 on the basis of the environment data transmitted from the environment sensors. After step 626, the service provider 3 stores the environment of the area (the vicinity) of the vehicle 2 in service with the computation and analysis on the basis of the environment data transmitted from the environment sensors in the vehicle service environment database 39 of the processing equipment 30 in step 628.

After the service provider 3 stores the environment of the area (the vicinity) of the vehicle 2 in service with the computation and analysis on the basis of the environment data transmitted from the environment sensors in the vehicle service environment database 39 of the processing equipment 30 in step 628, the service provider 3 receives the position data in step 630, which is received from the GPS satellite 8 with the GPS receiver 28 of the vehicle mounted unit 20 at regular intervals, translated into the position data of latitude and longitude and transmitted by the transmitter receiver 23 of the vehicle mounted unit 20. After the translated position data of latitude and longitude is received in step 630, the service provider 3 stores in step 632 the information on the road and road surface in the road/road surface database 40 of the processing equipment 30, of the environment of the vehicle 2 in service, which has been computed with the environment data transmitted by the environment sensors.

In the above circumstances, the service provider 3 makes a judgment on whether or not there are any parts that don't satisfy the criteria defined for the respective inspection required parts (condition monitor parts), namely any parts needed to replace in step 634. When the service provider 3 determines that there are parts needed to replace of the inspection required parts (condition monitor parts), it will transmit the display page showing the list of the parts needed to replace of the inspection required parts (condition monitor parts) to the business unit 1 in step 636.

When the service provider 3 determines that there are no parts needed to replace of the inspection required parts (condition monitor parts) in step 634 or transmits the display page showing the list of the replacement parts to the business unit 1 in step 636, the service provider 3 regularly transmits the information on degradation of good or bad of the inspection required parts (condition monitor parts) and the list of the replacement required parts of the inspection required parts (condition monitor parts) for each vehicle 2 to the business unit 1 in step 638.

All inspection required parts used for the vehicle 2 will not develop degradation to dissatisfy the criteria and require replacement simultaneously. Their service lives differ from part to part. Therefore, after the service provider 3 regularly transmits the information on degradation of good or bad of the inspection required parts (condition monitor parts) and the list of the replacement required parts of the inspection required parts (condition monitor parts) for each vehicle 2 to the business unit 1 in step 638, it will transmits the latest information on degradation of good or bad of the inspection required parts (condition monitor parts) to the business unit 1 regularly in step 640.

On the other hand, there is a case that the service provider 3 receives an inquiry about the information on degradation of the condition monitor parts (inspection required parts) at the inspection-maintenance for the particular vehicle 2 from the business unit 1 (step 642). When the polling is conducted by the business unit 1 about the information on degradation of the condition monitor parts (inspection required parts) at the inspection-maintenance for the particular vehicle 2 in step 642, the service provider 3 makes a judgment on whether or not there are any parts that don't satisfy the criteria defined for the respective inspection required parts (condition monitor parts), namely any parts needed to replace, of the inspection required parts (condition monitor parts) used for the designated vehicle 2 in step 644. When the service provider 3 determines that there are the parts to replace of the inspection required parts (condition monitor parts) in step 644, it will transmit the display page showing the list of the parts needed to replace of the inspection required parts (condition monitor parts) to the business unit 1 in step 646.

When the service provider 3 determines that there are no parts needed to replace of the inspection required parts (condition monitor parts) in step 644 or transmits the display page showing the list of the replacement parts to the business unit 1 in step 646, the service provider 3 regularly transmits the information on degradation of good or bad of the inspection required parts (condition monitor parts) and the list of the replacement required parts of the inspection required parts (condition monitor parts) for each vehicle 2 to the business unit 1 in step 648.

Further, the service provider 3 makes a judgment on the service lives and the conditions of degradation of the inspection required parts used for (mounted on) the vehicle 2 according to the time periods of use of the inspection required parts used for (mounted on) the vehicle 2 and the environment of the vehicle 2 in service obtained from the environment sensors. When a judgment is made on the service lives and the conditions of degradation of the inspection required parts used for (mounted on) the vehicle 2 in step 650, the service provider 3 transmits whether or not the replacement is required for the inspection required parts used for (mounted on) the vehicle 2 in step 652. When the business unit 1 has replaced the replacement required parts of the inspection required parts used for (mounted on) the vehicle 2 according to the information on the replacement of the inspection required parts used for (mounted on) the vehicle 2 transmitted by the service provider 3 in step 652, the business unit 1 transmits the information on the parts replacement, which is received by the service provider 3 in step 654 as the vehicle maintenance data of the inspection required parts having been replaced at the inspection. After step 654, the service provider 3 stores the inspection required parts (condition monitor parts), which have been replaced or repaired at the inspection in step 656, thereby completing the flow.

What is claimed is:

1. A protective maintenance service system for vehicles by a service provider, with which a business unit that controls a plurality of vehicles makes a contract of protective maintenance service for monitoring conditions of inspection required parts of the respective vehicles that are under the control of said business unit, wherein databases comprise, a vehicle database provided by the business unit in advance, which stores the information of vehicles under the control of the business unit, a vehicle inspection parts database, which stores the contents and service lives of the inspection required parts of the respective vehicles that are provided by the business unit in advance and stored in said vehicle database, a part condition sensor database, which stores the sensors attached to the parts that require continuous condition monitoring, of the respective inspection required parts stored in said vehicle inspection parts database, an environment sensor database, which stores the sensors that are mounted on the vehicles stored in said vehicle database and detect the ambient environments of the vehicles, a vehicle service environment database, which stores the environmental conditions under which the vehicles stored in said vehicle database are in service, a road/road surface database, which stores the information on roads and road surfaces on maps incorporating the road and road surface data that is provided by said respective vehicles, a vehicle condition monitoring database, which stores the conditions of the respective parts of the respective vehicles that are stored in said vehicle database, a maintenance database, which stores the information on repair and replacement of the respective inspection required parts that are stored in said vehicle inspection parts database at inspection-maintenance, a map database, which stores the map information throughout a country, and the current degradation conditions of the respective parts are stored in said vehicle condition monitoring database, by determining the degradation conditions of the inspection required parts stored in said vehicle inspection parts database on the basis of, the part condition information detected by the part condition sensors and stored in said part condition sensor database, the environment information of the vehicles in service stored in said vehicle service environment database based on the vehicle ambient environment information detected by the environment sensors stored in said environment sensor database, and the road and road surface information stored in said road/road surface information database.

2. The protective maintenance service system for vehicles according to claim 1, wherein an alarm of part replacement is transmitted to said business unit when a search for time of part replacement is made for each inspection required part stored in said vehicle inspection parts database, by determining the time of replacement on the basis of the data detected by a part condition sensor stored in said part condition sensor database, or by determining a time of replacement on the basis of a service life compensated with an actual service environment stored in the environment sensor database for a part without said part condition sensor.

3. The protective maintenance service system for vehicles according to claim 1, wherein an expected value by computation for a time of part replacement is transmitted to said business unit for each inspection required part stored in said vehicle inspection parts database, by computing the expected time of part replacement with the change of an inspection required part per time and the degree of degradation development of the inspection required part, which is computed with the change of the inspection required part per time detected by the part condition sensor stored in said part condition sensor database and a mileage per time in the past, and by computing an expected time of part replacement on the basis of a service life compensated with an actual service environment stored in the environment sensor database for a part without said part condition sensor.

4. The protective maintenance service system for vehicles according to claim 2, wherein an expected value by computation for a time of part replacement is transmitted to said business unit for each inspection required part stored in said vehicle inspection parts database, by computing the expected time of part replacement with the change of an inspection required part per time and the degree of degradation development of the inspection required part, which is computed with the change of the inspection required part per time detected by the part condition sensor stored in said part condition sensor database and a mileage per time in the past, and by computing an expected time of part replacement on the basis of a service life compensated with an actual service environment stored in the environment sensor database for a part without said part condition sensor.

5. The protective maintenance service system for vehicles according to claim 1, wherein the current conditions of degradation of a part, which are stored in said vehicle condition monitoring database, are supplied at the request of said business unit.

6. The protective maintenance service system for vehicles according to claim 2, wherein the current conditions of degradation of a part, which are stored in said vehicle condition monitoring database, are supplied at the request of said business unit.

7. The protective maintenance service system for vehicles according to claim 3, wherein the current conditions of degradation of a part, which are stored in said vehicle condition monitoring database, are supplied at the request of said business unit.

8. The protective maintenance service system for vehicles according to claim 3, wherein the current conditions of degradation of a part, which are stored in said vehicle condition monitoring database, are supplied at the request of said business unit.

9. The protective maintenance service system for vehicles according to claim 1, wherein the contents and service life of a part, which are stored in said vehicle inspection parts database, are updated on the basis of the maintenance data stored in said maintenance database.

10. The protective maintenance service system for vehicles according to claim 2, wherein the contents and service life of a part, which are stored in said vehicle inspection parts database, are updated on the basis of the maintenance data stored in said maintenance database.

11. The protective maintenance service system for vehicles according to claim 3, wherein the contents and service life of a part, which are stored in said vehicle inspection parts database, are updated on the basis of the maintenance data stored in said maintenance database.

12. The protective maintenance service system for vehicles according to claim 4, wherein the contents and service life of a part, which are stored in said vehicle inspection parts database, are updated on the basis of the maintenance data stored in said maintenance database.

13. The protective maintenance service system for vehicles according to claim 1, wherein the vehicle inspection parts database, which stores the contents and service life of a replaced inspection required part, is updated subsequent to updating of said maintenance database.

14. The protective maintenance service system for vehicles according to claim 2, wherein the vehicle inspection parts database, which stores the contents and service life of a replaced inspection required part, is updated subsequent to updating of said maintenance database.

15. The protective maintenance service system for vehicles according to claim 3, wherein the vehicle inspection parts database, which stores the contents and service life of a replaced inspection required part, is updated subsequent to updating of said maintenance database.

16. The protective maintenance service system for vehicles according to claim 4, wherein the vehicle inspection parts database, which stores the contents and service life of a replaced inspection required part, is updated subsequent to updating of said maintenance database.

17. A protective maintenance service method for vehicles, comprising:

storing inspection-required parts information in a vehicle inspection parts database at a service provider, the inspection required parts information being related to a plurality of vehicles controlled by a business unit and being provided by the business unit to the service provider, detecting a part condition of at least one inspection-required part of the vehicles using a part condition sensor mounted on the respective vehicles, and generating an alarm indicating a time of part replacement is approaching based on the detected part condition; and determining a service life compensated by an actual service environment of at least one other inspection-required part lacking a part condition sensor mounted on the vehicle, and generating an alarm indicating a time of part replacement is approaching based on the determined service life.

18. The protective maintenance service method for vehicles according to claim 17, wherein at least one inspection-required part has a defined performance requirement for driving safety, and wherein an alarm indicating a time of replacement for the part is transmitted to a vehicle mounted unit.

19. The protective maintenance service method for vehicles according to claim 17, wherein the actual service environment is detected by environment sensors mounted on the respective vehicles.

20. A protective maintenance service method for vehicles, comprising:

storing inspection-required parts information in a vehicle inspection parts database at a service provider, the inspection required parts information being related to a plurality of vehicles controlled by a business unit and being provided by the business unit to the service provider, providing an expected time of part replacement for at least one part having a part condition sensor, the expected time of part replacement being computed with the change of an inspection required part per time and the degree of degradation development of the inspection required part, which is computed with the change of the inspection required part per time detected by said part condition sensor and a mileage per time in the past; and providing an expected time of part replacement for at least one part lacking a part condition sensor, the expected time of part replacement being computed using a service life compensated with an actual service environment.

21. The protective maintenance service method for vehicles according to claim 20, wherein the actual service environment is detected by environment sensors mounted on the respective vehicles.

* * * * *